(12) United States Patent
Megson et al.

(10) Patent No.: US 11,328,327 B1
(45) Date of Patent: May 10, 2022

(54) METHOD AND APPARATUS FOR AUTOMATED MERCHANT ACQUISITION

(71) Applicant: Groupon, Inc., Chicago, IL (US)

(72) Inventors: Will Megson, Chicago, IL (US); Shafiq Shariff, Chicago, IL (US); Christopher Powers, Waukegan, IL (US); Logan T. Jennings, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 1362 days.

(21) Appl. No.: 14/858,468

(22) Filed: Sep. 18, 2015

Related U.S. Application Data

(60) Provisional application No. 62/052,726, filed on Sep. 19, 2014.

(51) Int. Cl.
*G06Q 30/00* (2012.01)
*G06Q 30/02* (2012.01)

(52) U.S. Cl.
CPC ..... *G06Q 30/0276* (2013.01); *G06Q 30/0204* (2013.01)

(58) Field of Classification Search
None
See application file for complete search history.

(56) References Cited

U.S. PATENT DOCUMENTS

| | | | | |
|---|---|---|---|---|
| 9,947,022 | B1* | 4/2018 | Shariff | G06N 5/02 |
| 9,996,859 | B1 | 6/2018 | Koshy et al. | |
| 10,108,974 | B1* | 10/2018 | Shariff | G06Q 30/0201 |
| 10,192,256 | B2* | 1/2019 | Chang | G06Q 30/0204 |
| 2002/0095322 | A1* | 7/2002 | Zarefoss | G06Q 10/06 717/100 |
| 2003/0033179 | A1* | 2/2003 | Katz | G06Q 10/063 705/7.12 |

(Continued)

OTHER PUBLICATIONS

Lee, In, and Kyoochun Lee. "Social shopping promotions from a social merchant's perspective." Business Horizons 55.5 (2012): 441-451. (Year: 2012).*

(Continued)

*Primary Examiner* — Michael Bekerman
(74) *Attorney, Agent, or Firm* — Alston & Bird LLP

(57) ABSTRACT

A method, apparatus, and computer program product are disclosed for improving merchant outreach campaigns by a promotion and marketing service. An example apparatus includes content harvest circuitry, segmentation circuitry, trigger detection circuitry, and campaign generation circuitry. The content harvesting circuitry may include hardware configured to retrieve electronic marketing information, business analytic data, and sales intelligence data. The segmentation circuitry may include hardware configured to determine merchant segmentation criteria, and to classify merchants into segments based on the merchant segmentation criteria. The trigger detection circuitry may include hardware configured to identify occurrence of a triggering event. The campaign generation circuitry may include hardware configured to design a merchant outreach campaign based on the sales intelligence data and, in response to identification of a triggering event by the triggering detection circuitry, to transmit merchant-specific correspondence in accordance with the merchant outreach campaign.

20 Claims, 15 Drawing Sheets

(56) References Cited

U.S. PATENT DOCUMENTS

| | | | |
|---|---|---|---|
| 2005/0278211 A1* | 12/2005 | Adams | G06Q 30/0242 705/14.41 |
| 2006/0111921 A1* | 5/2006 | Chang | G06Q 10/06375 705/301 |
| 2007/0130000 A1* | 6/2007 | Assanassios | G06Q 30/0226 705/14.14 |
| 2008/0004955 A1* | 1/2008 | Mathew | G06Q 30/0251 705/14.52 |
| 2008/0086359 A1* | 4/2008 | Holton | G06Q 30/0201 705/7.29 |
| 2008/0162268 A1* | 7/2008 | Gilbert | G06Q 30/02 705/7.29 |
| 2010/0114899 A1* | 5/2010 | Guha | G06F 16/9535 707/741 |
| 2011/0093324 A1* | 4/2011 | Fordyce, III | G06Q 30/0226 705/14.27 |
| 2013/0246120 A1* | 9/2013 | Chang | G06Q 30/0204 705/7.29 |
| 2014/0278977 A1* | 9/2014 | Newton | G06Q 30/0255 705/14.53 |
| 2015/0046204 A1* | 2/2015 | Sitina | G06Q 10/063 705/7.11 |
| 2016/0063560 A1* | 3/2016 | Hameed | G06Q 30/0269 705/14.61 |

OTHER PUBLICATIONS

Edelman, Benjamin, Sonia Jaffe, and Scott Duke Kominers. To groupon or not to groupon: The profitability of deep discounts. Harvard Business School, 2010. (Year: 2010).*

* cited by examiner

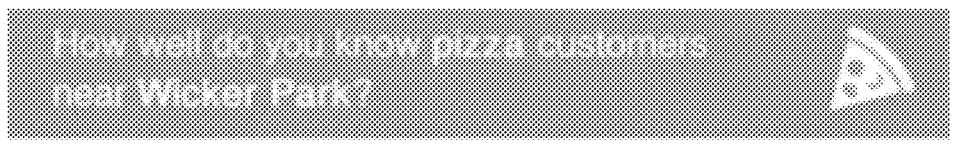

Hi Tom,

Did you know pizza diners in Wicker Park are loyal, travel in groups and spend more than the average. Check out these interesting facts and tips about diners in your area...

Pizza is a favorite food
1 out of 4 food purchases in Wicker Park are for Pizza

*TIP: Use pizza offerings to draw people in and bundle it with other dishes to promote your full menu.*

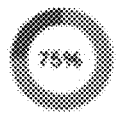

Dine-out close by
Area customers typically dine-out within 2 miles of their home

*TIP: Promote time-based deals at to fill empty tables and optimize your customer flow.*

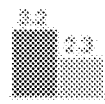

Visit in larger groups
Area diners have an average party of 3.2 vs. 2.3 city average.

*TIP: Women tend to book in larger parties, and positively respond to drink pairings.*

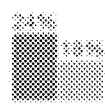

Are better tippers
Area diners tip an average of 24% vs. 18% city average

*TIP: Adding in a surprise free dessert or drink tends to increase the average tip by 20%*

Are More Loyal
82% of area diners revisit within 3 months of purchase

*TIP: Structuring multi-visit offers and rewards programs are key drivers of repeat business.*

Click the button below to subscribe to market data alerts for your business

FIG. 12

GROUPON
Over 15,000 Groupon Customers are Looking for You
15,375 potential customers searched for your business in the last month. 5.8% will make a purchase
Other related searches include - Skydive, Sky Diving, Outdoor, Activities, Sports
Learn more about how Groupon is the best.
 OR 
Or call [REP NAME] at 555-555-5555
FIG. 13

METHOD AND APPARATUS FOR AUTOMATED MERCHANT ACQUISITION

CROSS-REFERENCE TO RELATED APPLICATIONS

This applications claims the benefit of U.S. Provisional Patent Application No. 62/052,726, filed Sep. 19, 2014, the entire contents of which are incorporated herein by reference.

TECHNOLOGICAL FIELD

Example embodiments of the present invention relate generally to promotion and marketing service management and, more particularly, to a method and apparatus that improves and automates the nature and frequency of merchant outreach.

BACKGROUND

Applicant has discovered problems with existing modes of merchant outreach by promotion and marketing services. Through applied effort, ingenuity, and innovation, Applicant has solved many of these identified problems by developing a solution that is embodied by the present invention and described in detail below.

BRIEF SUMMARY

Accordingly, a method, apparatus, and computer program product are provided that improve upon existing mechanisms for merchant outreach by promotion and marketing services. In an example embodiment, a method, apparatus and computer program product are provided that evaluate existing and potential merchant partners, harvest content regarding these merchants, and develop and implement campaigns for contacting the merchants based on the evaluations, the harvested content, and a set of triggering events.

In a first example embodiment, an apparatus is provided for improving merchant outreach campaigns by a promotion and marketing service. The apparatus may include content harvest circuitry, segmentation circuitry, trigger detection circuitry, and campaign generation circuitry. The content harvesting circuitry may include hardware configured to retrieve electronic marketing information, business analytic data, and sales intelligence data. The segmentation circuitry may include hardware configured to determine merchant segmentation criteria, and to classify merchants into segments based on the merchant segmentation criteria. The trigger detection circuitry may include hardware configured to identify occurrence of a triggering event. The campaign generation circuitry may include hardware configured to design a merchant outreach campaign based on the sales intelligence data and, in response to identification of a triggering event by the triggering detection circuitry, to transmit merchant-specific correspondence in accordance with the merchant outreach campaign.

In one embodiment of the apparatus, the content harvesting circuitry may include hardware configured to retrieve electronic marketing information by harvesting clickstream data, location data, transaction data, communication channel data, or discretionary data from a consumer or merchant device, or, in an instance in which the electronic marketing information has previously been harvested, retrieving the electronic marketing information from the memory. The content harvesting circuitry may additionally or alternatively include hardware configured to generate the business analytic data based on the electronic marketing information. Moreover, the content harvesting circuitry may further include hardware configured to generate the sales intelligence data based on the electronic marketing information, the business analytic data, or both. Alternatively, the content harvesting circuitry may include hardware configured to collect sales intelligence data from a sales representative device, a merchant device, or a consumer device.

In another embodiment of the apparatus, the segmentation circuitry may include hardware configured to determine the merchant segmentation criteria based on at least one of the stored electronic marketing information, business analytic data, and sales intelligence data. Alternatively, the segmentation circuitry may include hardware configured to determine the merchant segmentation criteria by receiving one or more criteria selections.

In another embodiment of the apparatus, the trigger detection circuitry may include hardware configured to generate a set of triggering events by receiving an indication of one or more selected triggering events, wherein the triggering event comprises a member of the set of triggering events. Alternatively, in yet another embodiment, the trigger detection circuitry may include hardware configured to generate a set of triggering events based on the sales intelligence data, wherein the triggering event comprises a member of the set of triggering events. In this regard, the trigger detection circuitry may further include hardware configured to collect external data, and monitor the electronic marketing information, business analytic data, sales intelligence data, and external data for occurrence of any of the identified set of triggering events, wherein the trigger detection circuitry is configured to identify the occurrence of the trigger event in response to the monitoring of the electronic marketing information, business analytic data, sales intelligence data, and the external data. Moreover, the trigger detection circuitry may further include hardware configured to alert the campaign generation circuitry upon identification of the occurrence of the triggering event. Additionally or alternatively, the external data may be data collected from a set of hyperlinked websites, information regarding promotions listed by competitor promotion and marketing services, or social network activity.

In some embodiments of the apparatus, the campaign generation circuitry may include hardware configured to identify a merchant as a target of the merchant outreach campaign, retrieve sales intelligence data regarding the merchant, generate a correspondence template based on the sales intelligence data regarding the merchant, and generate the merchant-specific correspondence based on the correspondence template. In some such embodiments, the campaign generation circuitry may include hardware configured to generate a correspondence cadence specific to the merchant. In this regard, the campaign generation circuitry may include hardware configured to retrieve business analytic data specific to the merchant, and to generate the merchant-specific correspondence based on the business analytic data specific to the merchant.

In another example embodiment, a method is provided for improving merchant outreach campaigns by a promotion and marketing service. The method includes retrieving, by a network interface, electronic marketing information, business analytic data, and sales intelligence data, storing, by a non-transitory memory, the collected electronic marketing information, business analytic data, and sales intelligence data, and determining, by processing circuitry, merchant segmentation criteria. The method further includes classifying, by processing circuitry, merchants into segments based on the merchant segmentation criteria, identifying, by processing circuitry, occurrence of a triggering event, generating, by processing circuitry, a merchant outreach campaign based on the sales intelligence data, and transmitting, by a network interface, merchant-specific correspondence in accordance with the merchant outreach campaign.

In one such embodiment, retrieving the electronic marketing information includes at least one of harvesting clickstream data, location data, transaction data, communication channel data, or discretionary data from a consumer or merchant device, or, in an instance in which the electronic marketing information has previously been harvested, retrieving the electronic marketing information from the memory. Additionally, retrieving the business analytic data may include generating the business analytic data based on the electronic marketing information. Furthermore, retrieving the sales intelligence data may include generating the sales intelligence data based on the electronic marketing information, the business analytic data, or both. Alternatively, retrieving the sales intelligence data may include collecting the sales intelligence data from a sales representative device, a merchant device, or a consumer device.

In another embodiment, the determining of the merchant segmentation criteria is based on at least one of the stored electronic marketing information, business analytic data, and sales intelligence data. Alternatively, determining the merchant segmentation criteria comprises receiving one or more criteria selections.

In some embodiments, the method may include generating a set of triggering events by receiving an indication of one or more selected triggering events, wherein the triggering event comprises a member of the set of triggering events. Alternatively, the method may include generating a set of triggering events based on the sales intelligence data, wherein the triggering event comprises a member of the set of triggering events. Additionally or alternatively, the method may include collecting, by a network interface, external data, and monitoring, by processing circuitry, the electronic marketing information, business analytic data, sales intelligence data, and external data for occurrence of any of the identified set of triggering events, wherein the identifying of the occurrence of the trigger event is in response to the monitoring of the electronic marketing information, business analytic data, sales intelligence data, and the external data. In such cases, the method may further include alerting the campaign generation circuitry upon identification of the occurrence of the triggering event. Additionally or alternatively, the external data may be data collected from a set of hyperlinked websites, information regarding promotions listed by competitor promotion and marketing services, or social network activity.

In some embodiments, the method may include identifying a merchant as a target of the merchant outreach campaign, retrieving sales intelligence data regarding the merchant, generating a correspondence template based on the sales intelligence data regarding the merchant, and generating the merchant-specific correspondence based on the correspondence template. In such cases, the method may further include generating a correspondence cadence specific to the merchant. Moreover, the method may further include retrieving business analytic data specific to the merchant, and generating the merchant-specific correspondence based on the business analytic data specific to the merchant.

In another example embodiment, an apparatus is provided for improving merchant outreach campaigns by a promotion and marketing service. The apparatus includes means for retrieving electronic marketing information, business analytic data, and sales intelligence data, means for storing the collected electronic marketing information, business analytic data, and sales intelligence data, and means for determining merchant segmentation criteria. The apparatus further includes means for classifying merchants into segments based on the merchant segmentation criteria, means for identifying occurrence of a triggering event, means for generating a merchant outreach campaign based on the sales intelligence data, and means for transmitting merchant-specific correspondence in accordance with the merchant outreach campaign.

In one such embodiment, the means for retrieving the electronic marketing information includes at least one of means for harvesting clickstream data, location data, transaction data, communication channel data, or discretionary data from a consumer or merchant device, or means for, in an instance in which the electronic marketing information has previously been harvested, retrieving the electronic marketing information from the memory. Additionally, the means for retrieving the business analytic data may include means for generating the business analytic data based on the electronic marketing information. Furthermore, the means for retrieving the sales intelligence data may include means for generating the sales intelligence data based on the electronic marketing information, the business analytic data, or both. Alternatively, the means for retrieving the sales intelligence data may include means for collecting the sales intelligence data from a sales representative device, a merchant device, or a consumer device.

In another embodiment, the means for determining the merchant segmentation criteria comprises means for determining the merchant segmentation criteria based on at least one of the stored electronic marketing information, business analytic data, and sales intelligence data. Alternatively, the means for determining the merchant segmentation criteria comprises means for receiving one or more criteria selections.

In some embodiments, the apparatus may include means for generating a set of triggering events by receiving an indication of one or more selected triggering events, wherein the triggering event comprises a member of the set of triggering events. Alternatively, the apparatus may include means for generating a set of triggering events based on the sales intelligence data, wherein the triggering event comprises a member of the set of triggering events. Additionally or alternatively, the apparatus may include means for collecting external data, and means for monitoring the electronic marketing information, business analytic data, sales intelligence data, and external data for occurrence of any of the identified set of triggering events, wherein the identifying of the occurrence of the trigger event is in response to the monitoring of the electronic marketing information, business analytic data, sales intelligence data, and the external data. In such cases, the apparatus may further include means for alerting the campaign generation circuitry upon identification of the occurrence of the triggering event. Additionally or alternatively, the external data may be data collected from a set of hyperlinked websites, information regarding promotions listed by competitor promotion and marketing services, or social network activity.

In some embodiments, the apparatus may include means for identifying a merchant as a target of the merchant outreach campaign, retrieving sales intelligence data regarding the merchant, means for generating a correspondence template based on the sales intelligence data regarding the merchant, and means for generating the merchant-specific correspondence based on the correspondence template. In such cases, the method may further include generating a correspondence cadence specific to the merchant. Moreover, the apparatus may further include means for retrieving business analytic data specific to the merchant, and means for generating the merchant-specific correspondence based on the business analytic data specific to the merchant.

In yet another example embodiment, a non-transitory computer-readable storage medium is provided for improving merchant outreach campaigns by a promotion and marketing service. The non-transitory computer-readable storage medium includes program code instructions that, when executed, cause an apparatus to retrieve electronic marketing information, business analytic data, and sales intelligence data, store the collected electronic marketing information, business analytic data, and sales intelligence data, determine merchant segmentation criteria, classify merchants into segments based on the merchant segmentation criteria, identify occurrence of a triggering event, generate a merchant outreach campaign based on the sales intelligence data, and transmit merchant-specific correspondence in accordance with the merchant outreach campaign.

In some embodiments of the non-transitory computer-readable storage medium, retrieving the electronic marketing information includes at least one of harvesting clickstream data, location data, transaction data, communication channel data, or discretionary data from a consumer or merchant device, or in an instance in which the electronic marketing information has previously been harvested, retrieving the electronic marketing information from the memory. Alternatively, retrieving the business analytic data may include generating the business analytic data based on the electronic marketing information. Moreover, retrieving the sales intelligence data may include generating the sales intelligence data based on the electronic marketing information, the business analytic data, or both. Alternatively, retrieving the sales intelligence data may include collecting the sales intelligence data from a sales representative device, a merchant device, or a consumer device.

In other embodiments, the determining of the merchant segmentation criteria is based on at least one of the stored electronic marketing information, business analytic data, and sales intelligence data. Alternatively, the determining of the merchant segmentation criteria comprises receiving one or more criteria selections. In yet further embodiments, the program code instructions, when executed, may cause the apparatus to generate a set of triggering events by receiving an indication of one or more selected triggering events, wherein the triggering event comprises a member of the set of triggering events. Alternatively, the program code instructions, when executed, further cause the apparatus to generate a set of triggering events based on the sales intelligence data, wherein the triggering event comprises a member of the set of triggering events. In such cases, the program code instructions, when executed, may further cause the apparatus to collect external data, and monitor, the electronic marketing information, business analytic data, sales intelligence data, and external data for occurrence of any of the identified set of triggering events, wherein the identifying of the occurrence of the trigger event is in response to the monitoring of the electronic marketing information, business analytic data, sales intelligence data, and the external data. Moreover, the program code instructions, when executed, may further cause the apparatus to alert the campaign generation circuitry upon identification of the occurrence of the triggering event. In some embodiments, the external data is data collected from a set of hyperlinked websites, information regarding promotions listed by competitor promotion and marketing services, or social network activity.

In yet other embodiments, the program code instructions, when executed, further cause the apparatus to identify a merchant as a target of the merchant outreach campaign, retrieve sales intelligence data regarding the merchant, generate a correspondence template based on the sales intelligence data regarding the merchant, and generate the merchant-specific correspondence based on the correspondence template. In such embodiments, the program code instructions, when executed, may further cause the apparatus to generate a correspondence cadence specific to the merchant. Furthermore, the program code instructions, when executed, may further cause the apparatus to retrieve business analytic data specific to the merchant, and to generate the merchant-specific correspondence based on the business analytic data specific to the merchant.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
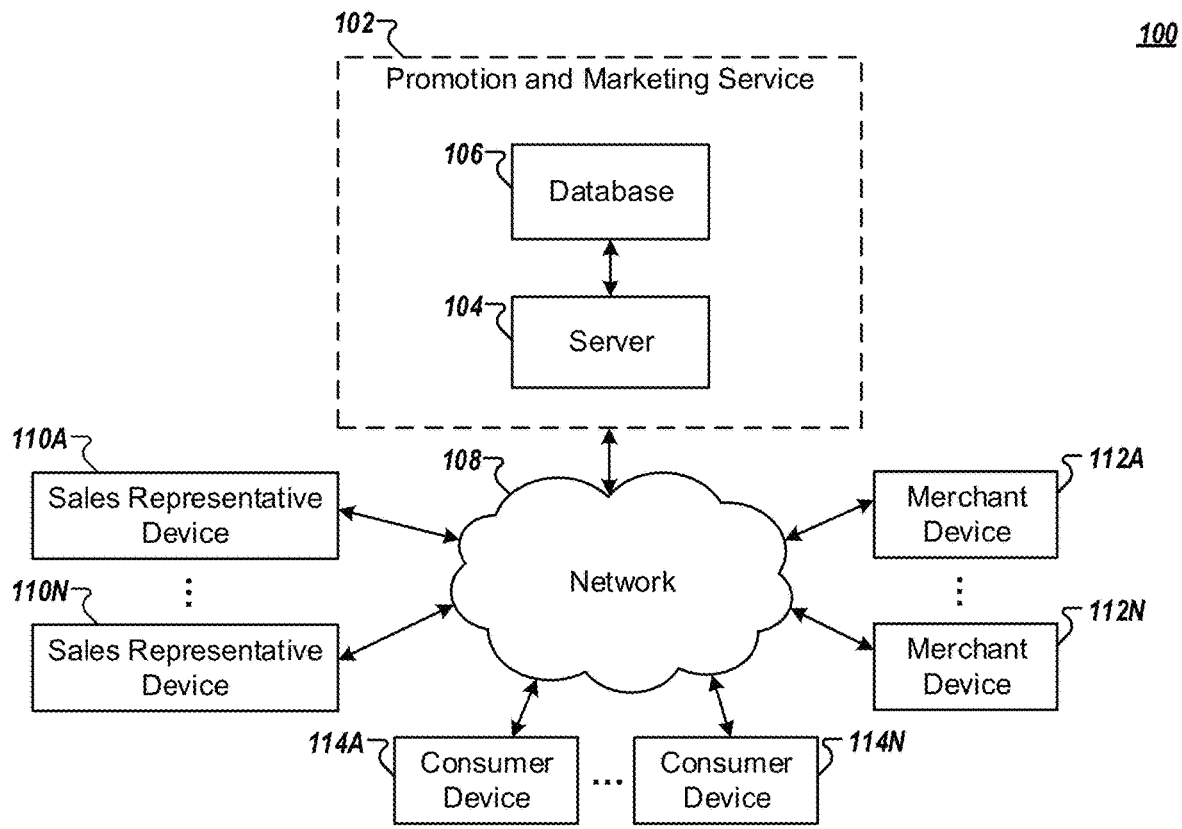
Figure 2:
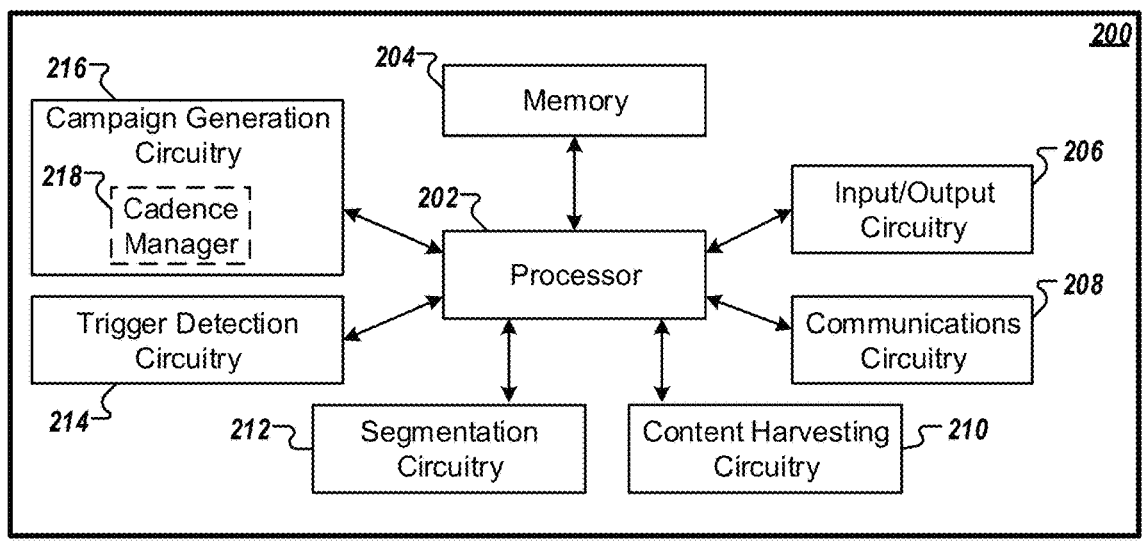
Figure 3:
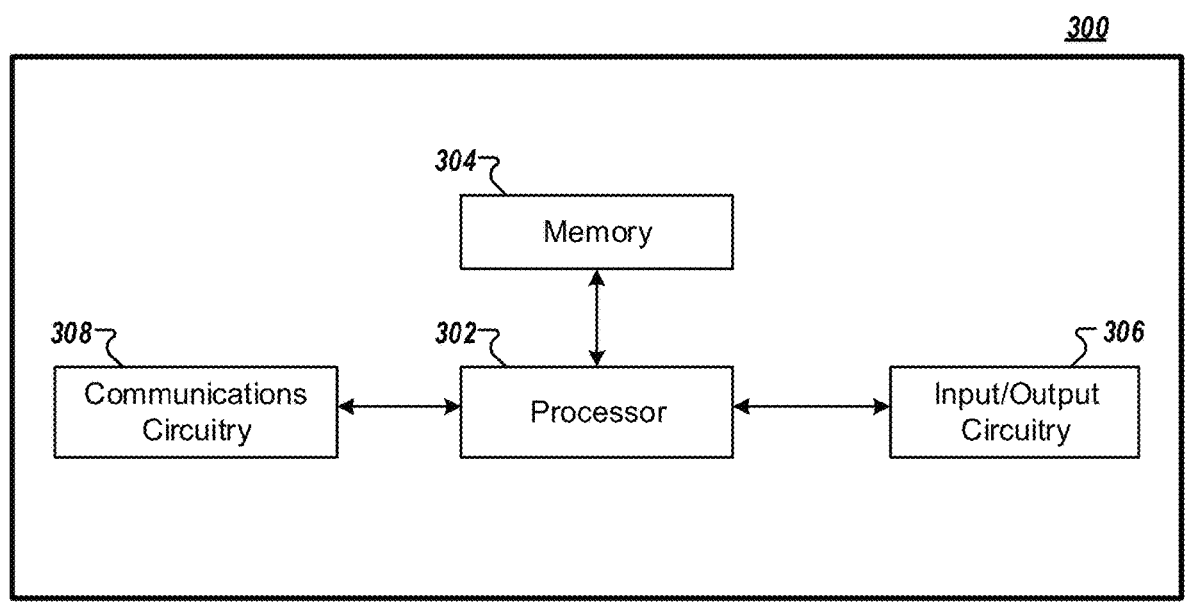
Figure 4:
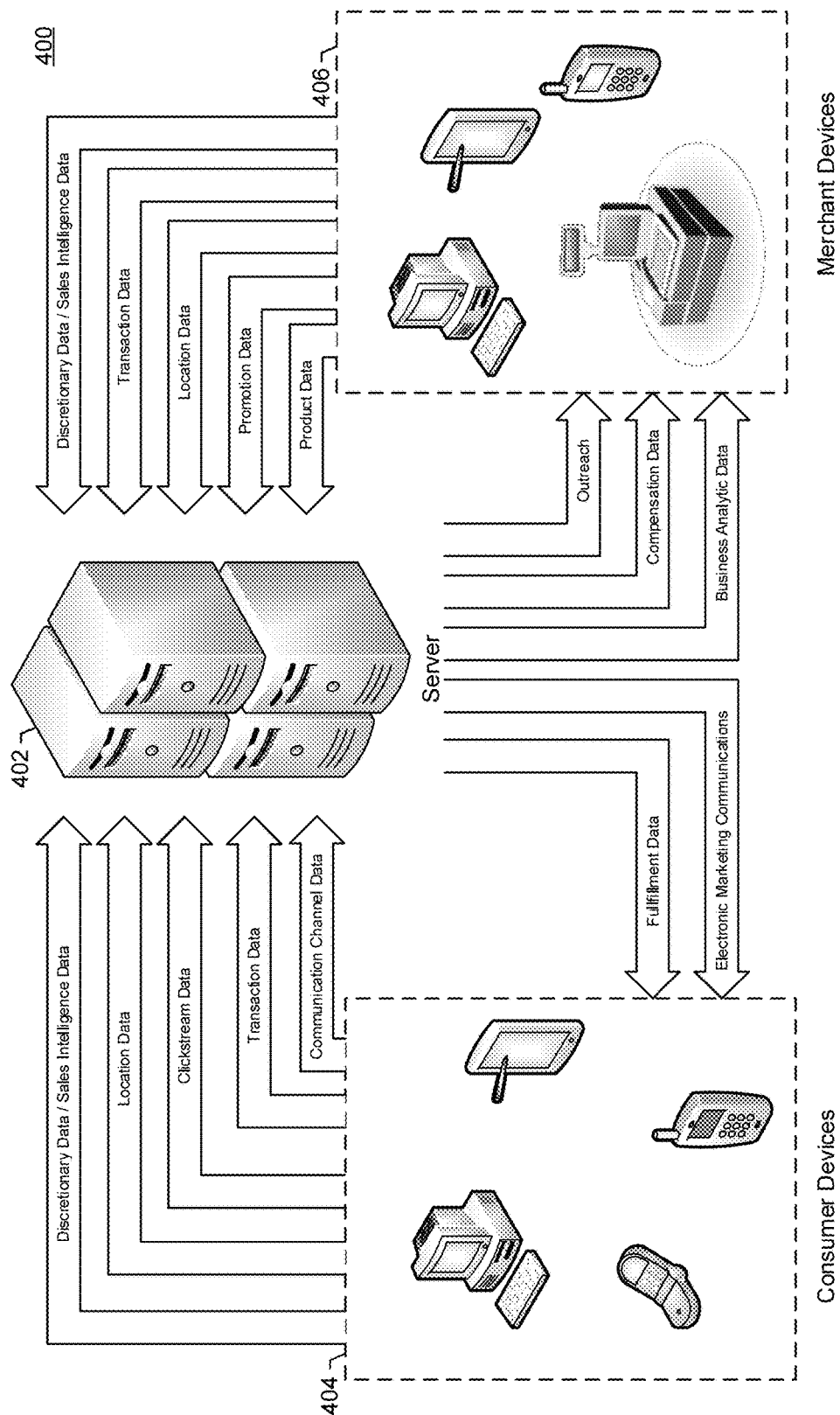
Figure 5:
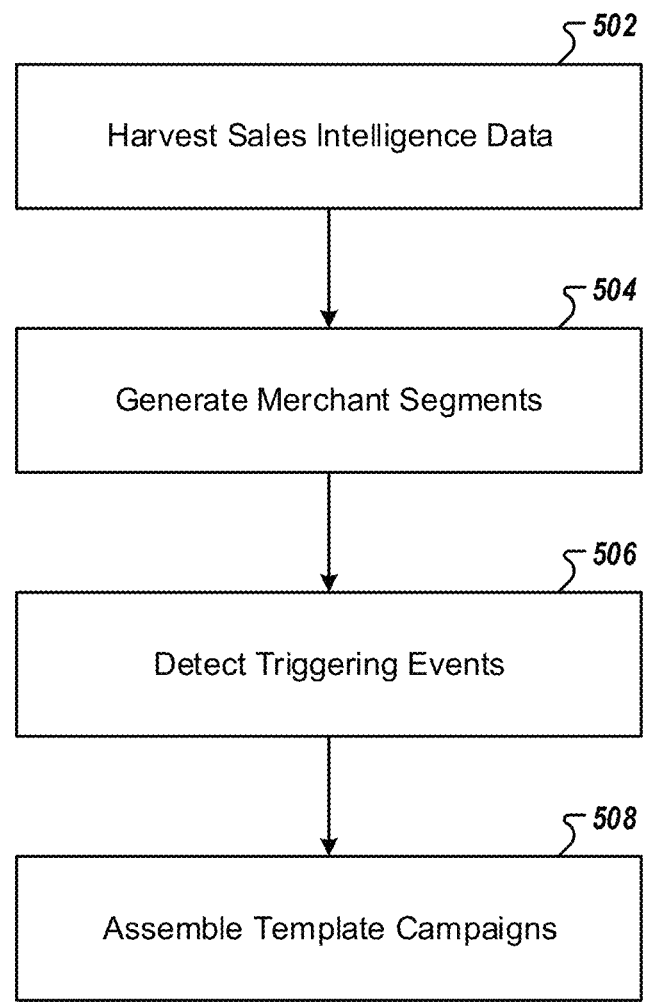
Figure 6:
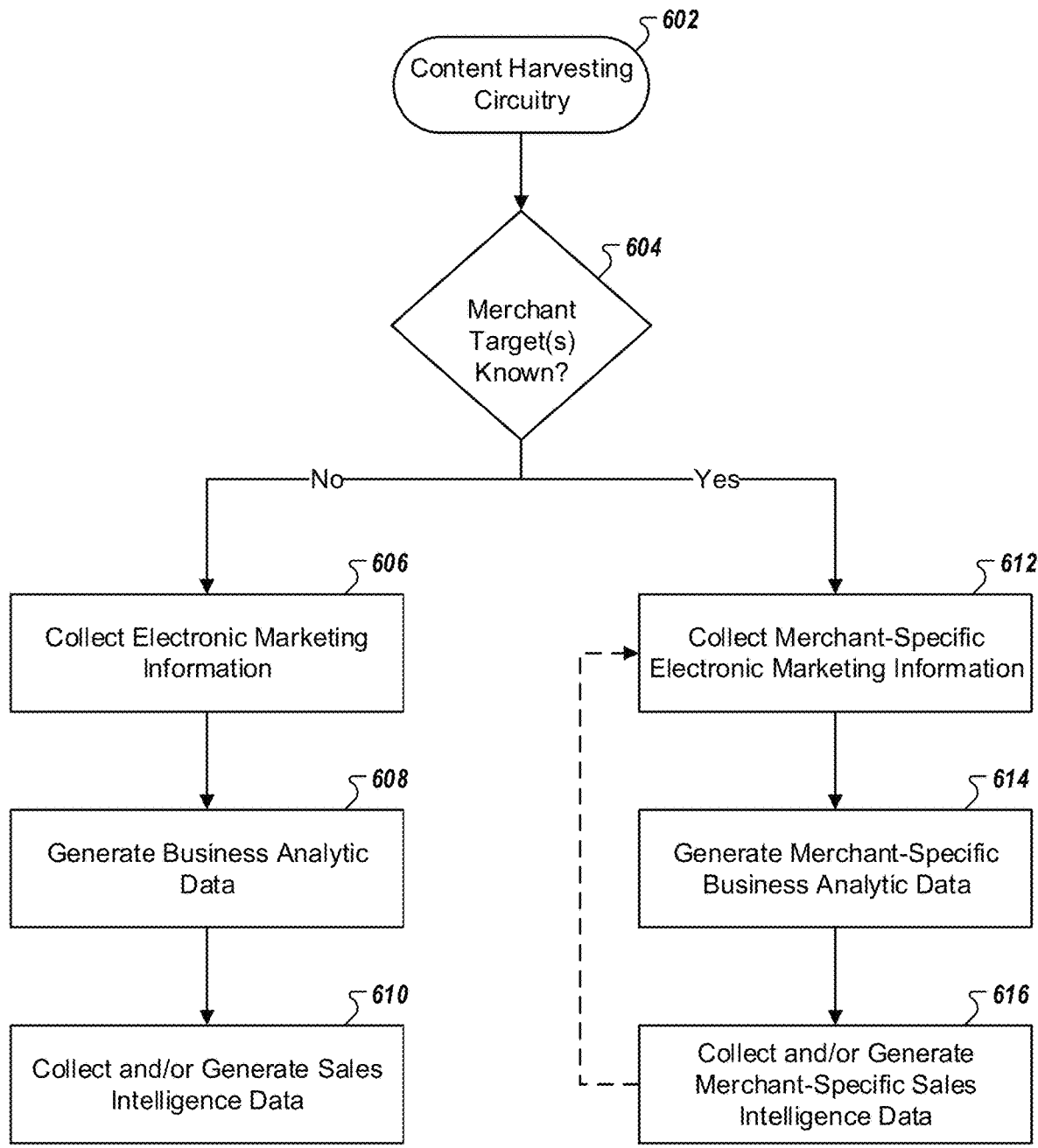
Figure 7:
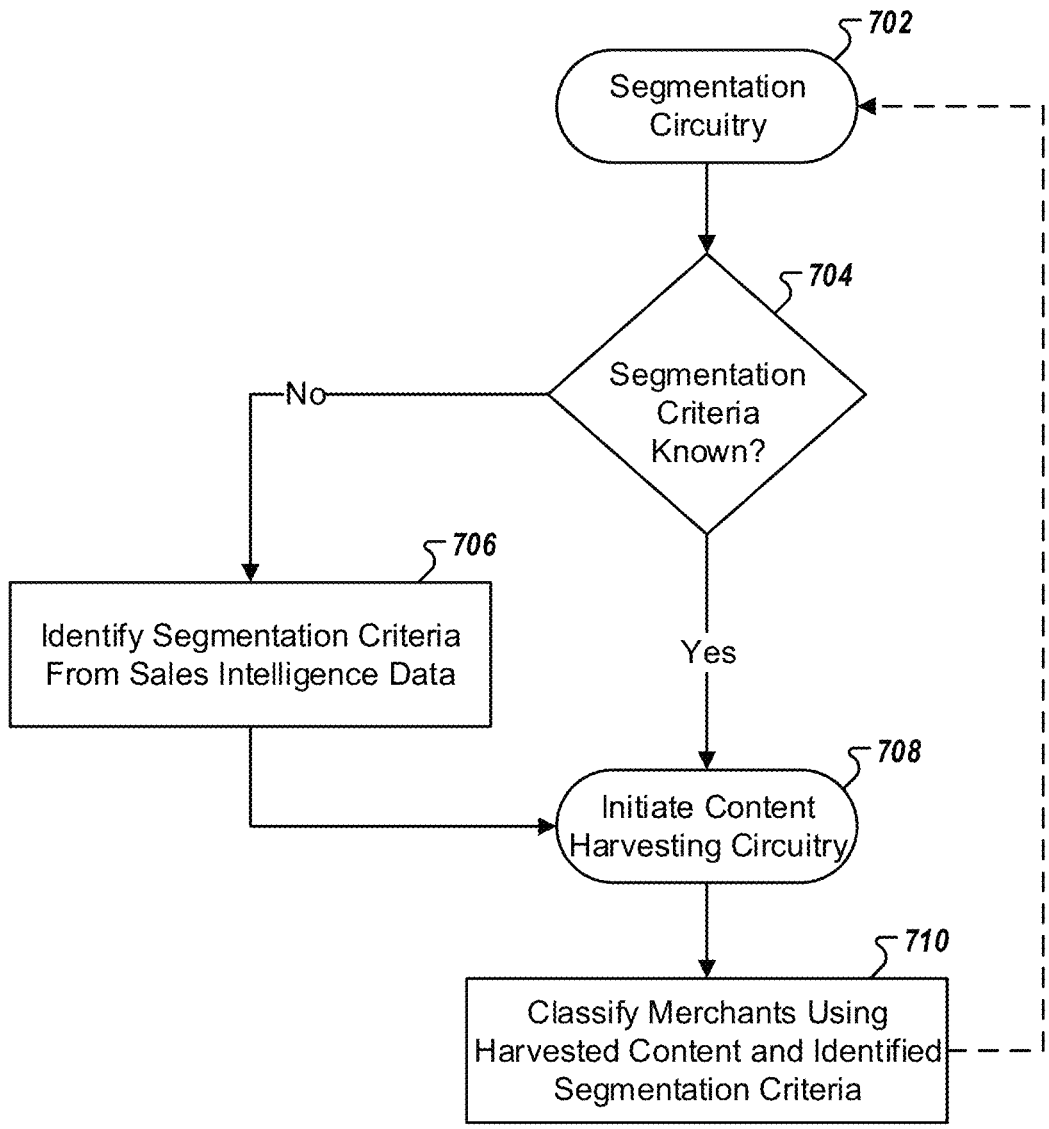
Figure 8:
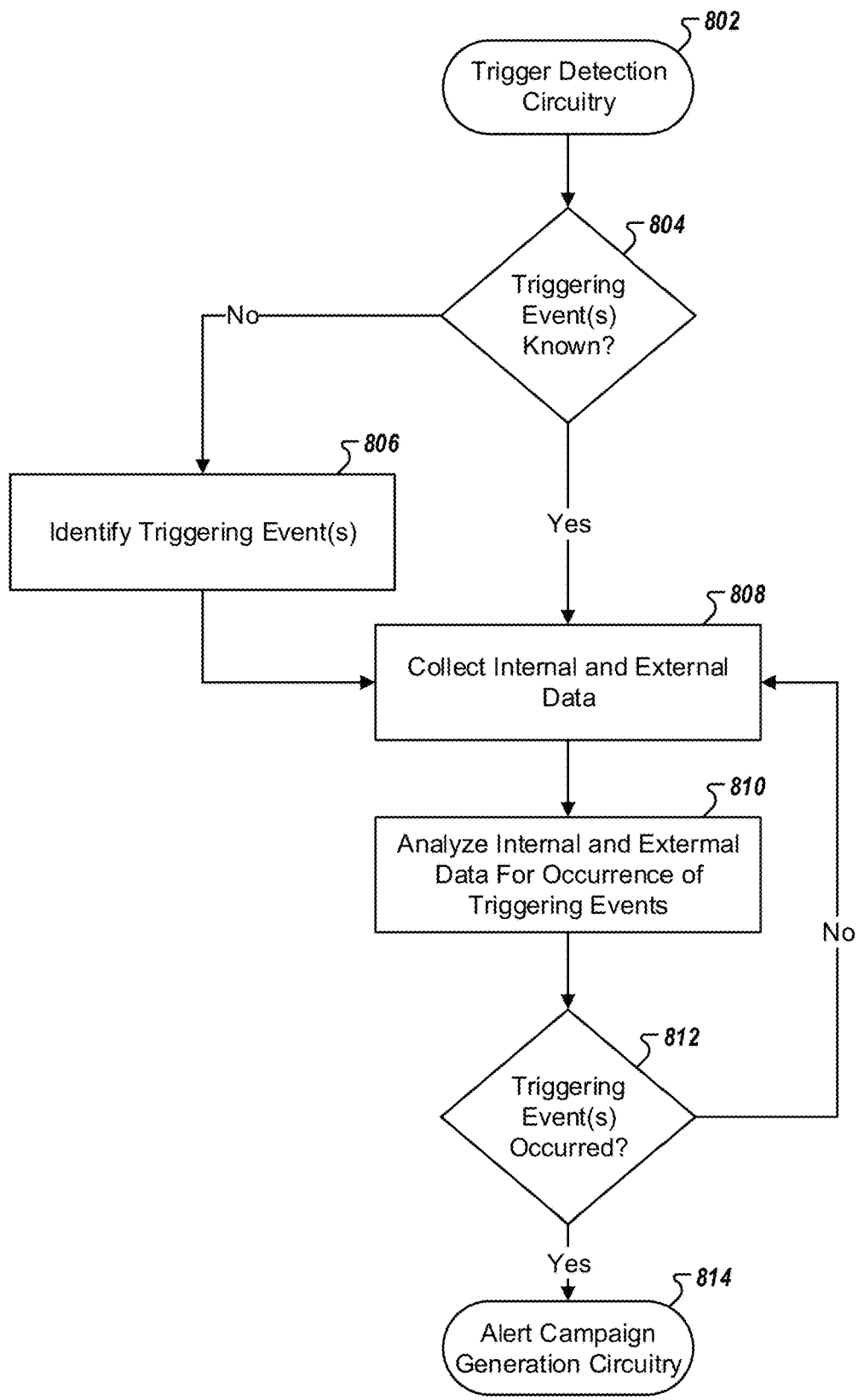
Figure 9:
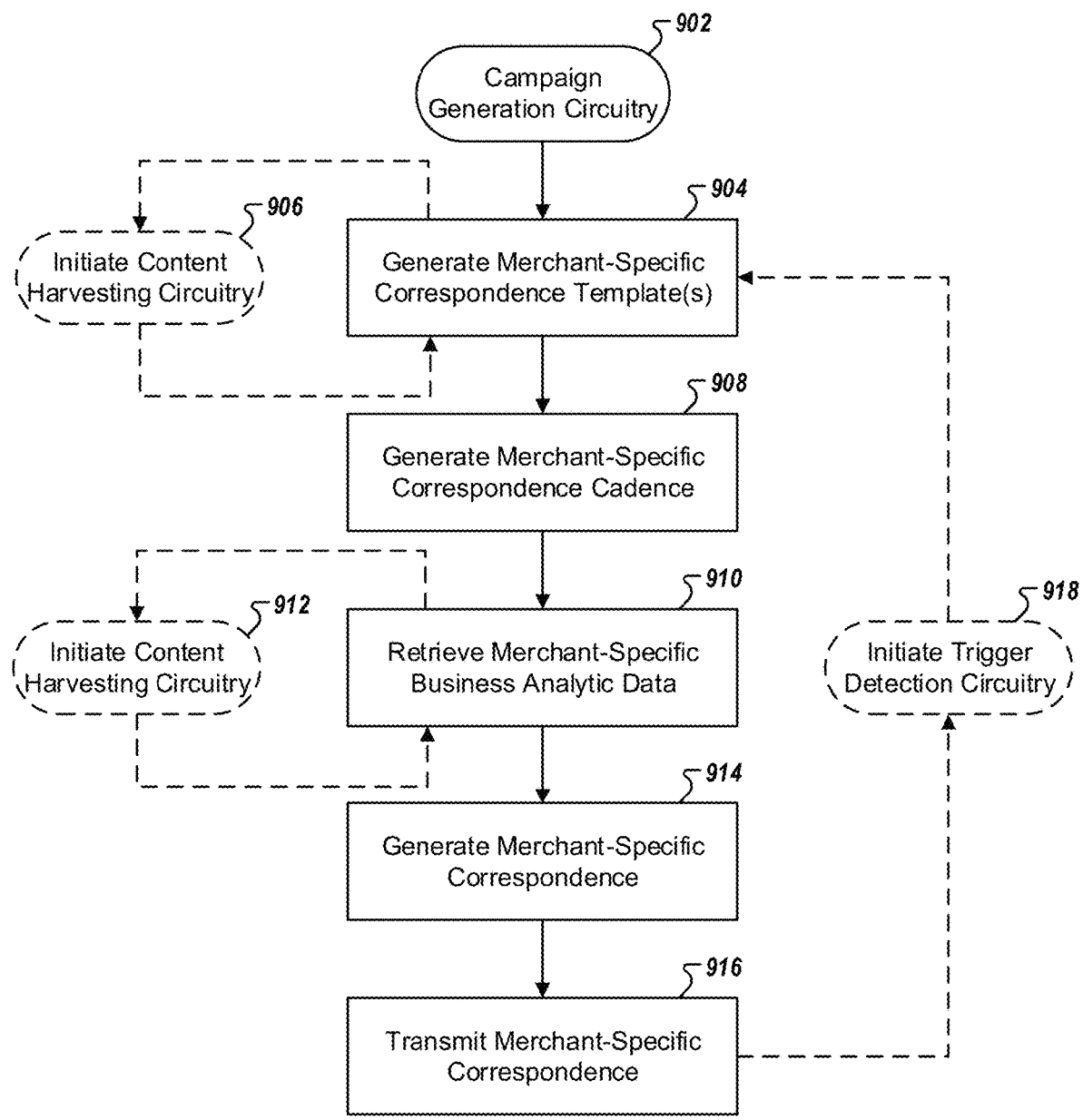
Figure 10:
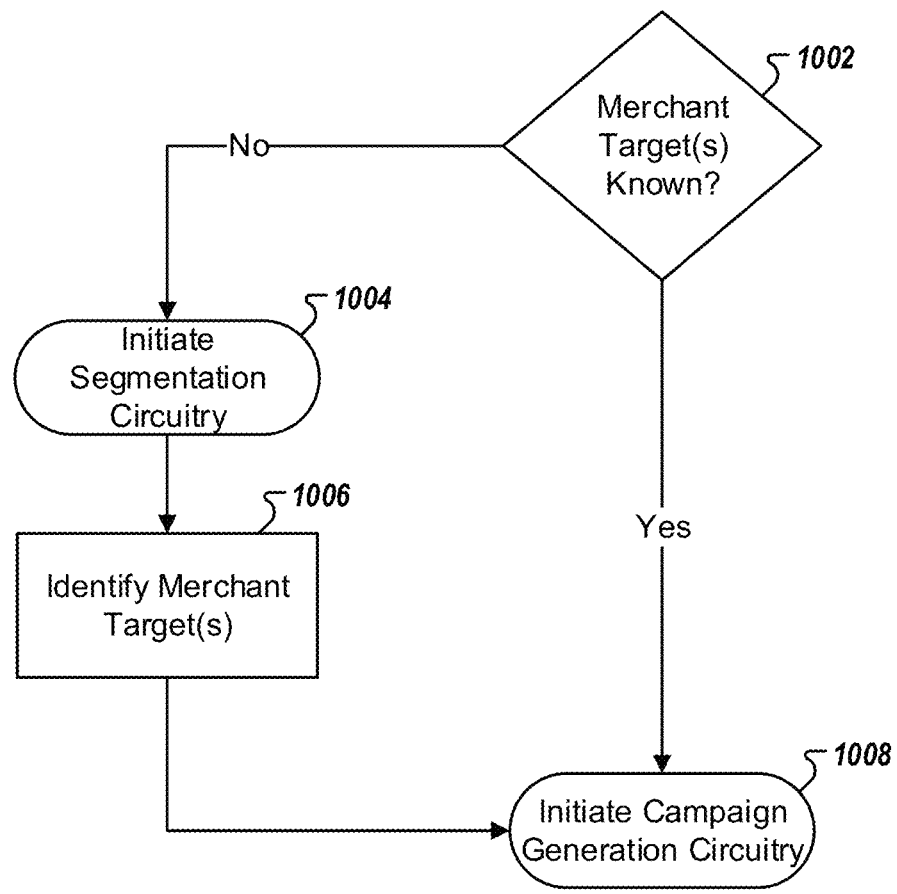

Having thus described certain example embodiments of the present disclosure in general terms, reference will now be made to the accompanying drawings, which are not necessarily drawn to scale, and wherein:

FIG. 1 shows an example system diagram, in accordance with an example embodiment of the present invention;

FIG. 2 illustrates a schematic block diagram of circuitry used in association with a promotion and marketing service, in accordance with some example embodiments;

FIG. 3 illustrates a schematic block diagram of circuitry embodying a user device, in accordance with some example embodiments;

FIG. 4 illustrates an example data flow diagram illustrating interactions between a server, one or more consumer devices, and one or more merchant devices, in accordance with some example embodiments;

FIG. 5 illustrates a flowchart describing example operations for generating template merchant outreach campaigns, in accordance with some example embodiments;

FIG. 6 illustrates a flowchart describing example operations for harvesting sales intelligence content, in accordance with some example embodiments;

FIG. 7 illustrates a flowchart describing example operations for classifying merchants into groups, in accordance with some example embodiments;

FIG. 8 illustrates a flowchart describing example operations for monitoring the occurrence of triggering events, in accordance with some example embodiments;

FIG. 9 illustrates a flowchart describing example operations for implementing a merchant outreach campaign, in accordance with some example embodiments;

FIG. 10 illustrates a flowchart describing example operations for generating a merchant outreach campaign, in accordance with some example embodiments; and FIG. 11-16 illustrate examples of merchant-specific correspondence, in accordance with an example embodiment of the present invention.

DETAILED DESCRIPTION

Overview

To successfully build a marketplace of local merchants that can deliver a great experience for consumers, a promotion and marketing service needs to bring many merchants to the platform. In this regard, each merchant that registers with the promotion and marketing service creates a positive externality, or network effect, and improves the value of the promotion and marketing service to consumers and to other merchants. The inventors have determined that a missing element of existing promotion and marketing services is a mechanism that actively develops new merchant relationships among merchants who are not already interested in working with the promotion and marketing service. By evaluating the most effective sales strategies used by sales representatives, utilizing flexible content from sales intelligence tools, identifying and monitoring relevant triggering events, and using automated workflows to create a highly relevant and customized sales experience for merchants, the inventors have developed an efficient system that improves merchant outreach.

To this end, the inventors have realized that while consumer outreach is often highly strategic and data-based, merchant outreach efforts are often ad hoc and inconsistent, and may fail to maximize merchant partnership opportunities. Accordingly, by optimizing the use of electronic marketing information, business analytic data, and sales intelligence data, a promotion and marketing service can scale the throughput of its merchant outreach efforts without requiring additional manpower. In fact, in many respects, less manpower is needed because the efficiency of individual outreach campaigns can be improved. Embodiments disclosed herein leverage the increasing amount and variety of electronic marketing information and business analytic data, and utilize the diverse modes of communicating with merchants to develop merchant marketing campaigns that maximize the likelihood of positive merchant engagement.

Various embodiments of the present invention are directed to improved apparatuses, methods, and computer readable media for automating the development of merchant-specific outreach campaigns based on, in some examples, a three-part foundation: improved content harvesting, improved segmentation of merchants, and improved identification of triggering events that positively correlate with favourable merchant reception. As is further demonstrated herein, utilizing embodiments of the present invention disclosed herein, these merchant-specific marketing campaigns can be highly personalized, in cadence and in content, based on sales intelligence data, optimized merchant segments, and the occurrence of relevant triggering events.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "merchant-specific correspondence" refers to any electronically generated information content provided by the promotion and marketing service to a merchant for the purpose of merchant acquisition. Merchant-specific correspondence may include any email, short message service (SMS) message, web page, application interface, or the like electronically generated for the purpose of attempting to develop a business relationship with the merchant.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the terms "sales representative" should be understood to refer to a person or entity operating on behalf of a promotion and marketing service. Sales representatives may include, without limitation, individuals, groups of individuals, corporations, affiliates, or the like. A sales representative is primarily tasked with engaging merchants and developing business relationships between the promotion and marketing service and the merchants. In some example embodiments, a sales representative may develop business relationships that take the form of contracts in which the promotion and marketing service offers promotions for products or services offered by merchants. In other cases, the business relationships may be prospective, and the sales representative function may be informational in nature. In this regard, sales representatives provide publicity for the promotion and marketing service, and may further perform merchant research that impacts future merchant outreach campaigns.

As used herein, the term "sales intelligence data" refers to electronic information collected or generated by the promotion and marketing service that informs merchant outreach. While discretionary data is provided primarily to improve the ease with which the consumer (or merchant) interacts with the promotion and marketing service, sales intelligence data improves the ability of the promotion and marketing service to interact with merchants and bolster partnership prospects. For example, sales intelligence data may include a merchant's business goals or needs, information about a business owner or manager (e.g., proficiency with technology, languages spoken, or other personal information), descriptions of the type and nature of correspondence that a merchant prefers, or any other information that might inform the success of a marketing outreach campaign directed to the merchant. In some cases, sales intelligence data and merchant discretionary data may overlap or otherwise be complementary.

It should be appreciated that "sales intelligence data" may be provided by a sales representative completing a form or survey on a website hosted by the promotion and marketing service or on an application residing on a sales representative device, but may be provided additionally or alternatively by a consumer or merchant in a similar fashion. In addition, sales intelligence data may be determined implicitly or through review or analysis of electronic marketing information provided to the promotion and marketing service and business analytic data generated by the promotion and marketing service. In some embodiments, it should further be appreciated that the promotion and marketing service may gate access to certain features or tools based on whether certain sales intelligence data has been provided. For example, the merchant may be required to provide some amount of sales intelligence data during a registration process. Similarly, the promotion and marketing service may request sales intelligence data directly from merchants or consumers in exchange for more favorable terms on subsequent promotions.

As used herein, a "triggering event" refers to an occurrence indicative of a potentially useful marketing opportunity for a promotion and marketing service. Triggering events comprise business-relevant events and are determined based on a predefined set of business rules. A triggering event may be identified from electronic marketing information, business analytic data, or sales intelligence data collected by a promotion and marketing service. For instance, identification of consumer demand for a particular product or service may comprise a triggering event that indicates an appropriate time to contact a merchant offering the particular product or service for sale. In addition to triggering events identified by analysis of internal data, triggering events may also simply be time-wise in nature (e.g., occurrence of a weekend, holiday, or seasonal change), or may comprise the occurrence of an external event (e.g., listing or conclusion of a promotion on a competing promotion and marketing service, identification of heightened merchant availability information on third party applications such as OpenTable®, information regarding new merchants that have recently begun offering products or services, or the like). Triggering events may be identified based on combinations of the above events. For instance, a triggering event may not occur based simply on a seasonal change, but may occur if that seasonal change occurs within a predetermined time of the identification of a new merchant that offers seasonally appropriate goods or services.

Technical Underpinnings and Implementation of
Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by merchants.

In many cases, the inventors have determined that these electronic marketing services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications to consumers and merchants in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

In order to offer digital promotions through a promotion and marketing service, representatives of the promotion and marketing service manually engage merchants and negotiate the components of the promotions to be offered to consumers by the promotion and marketing service. The initial registration and setup allowing a merchant to provide promotions via the promotion and marketing service is typically a lengthy and involved process. This process historically has hinged on the expertise of the sales representatives who engage with the merchants and their ability to ease the registration burden. In this regard, a streamlined self-service path (S3) (such as that described in U.S. patent application Ser. No. 14/039,842, filed on Sep. 27, 2013, the entire contents of which are incorporated herein by reference) works well for merchants already interested in working with the promotion and marketing service. However, to successfully build a marketplace of local merchants that delivers a great experience for consumers, a promotion and marketing service needs to leverage low cost opportunities to bring more merchants to the platform. Each merchant that registers with the promotion and marketing service creates a positive externality, or network effect, on the value of the promotion and marketing service to consumers and to other merchants. Among other reasons, this is because promotions from a large number of merchants will necessarily be a greater attraction to consumers than promotions from a smaller number of merchants. Merchants, in turn, reap the cascading benefits of increased consumer attention. Accordingly, merchant engagement is an important driver of success for all offerings by the promotion and marketing service.

Accordingly, the inventors have determined that a potentially missing element of existing promotion and marketing services is a mechanism that actively develops new merchant relationships among merchants who are not already interested in working with the promotion and marketing service. By evaluating the most effective sales strategies used by sales representatives, utilizing personalized content from sales intelligence tools, and using automated workflows to create a highly relevant and customized sales experience for merchants, the inventors have developed an efficient, automated, system for improved merchant outreach.

In some examples, good sales representatives will likely always remain essential to merchant engagement by promotion and marketing services. However, the hands-on nature of existing merchant outreach efforts is not easily scalable. As the number of merchants working with a promotion and marketing service increases, more and more sales representatives are required to meet the needs of these merchants in a reasonable time frame and to secure new merchant participation.

The inventors have identified various problems and difficulties that occur with traditional modes of merchant outreach. In particular, the process of contacting new merchants has historically required direct manual intervention by sales representatives at several stages to ensure an outreach effort surpassing a minimum quality threshold that targets merchants who (1) offer products or services that are of interest to consumers, and (2) would be open to collaboration with a promotion and marketing service. For example, to maximize the chances that a target merchant will be receptive to a marketing effort, the promotion and marketing service should transmit a communication (e.g., time, manner, level of detail, and frequency) that accords with the type of communication (in time, manner, level of detail, and frequency) that the target merchant will be receptive to. With a sufficiently large promotion and marketing service, electronic marketing information can be collected from the target merchant and/or similar merchants to facilitate creation of such a promotion. While electronic systems have been developed that reduce the need for manual intervention in targeted outreach, such systems typically provide limited flexibility regarding the nature of merchant correspondence. These systems therefore produce little marketing benefit, correspondence that is impersonal or, worse, correspondence that is irrelevant to the recipient, harmful to the brand of the promotion and marketing service, and which may foreclose potential business opportunities.

In other instances, sales representatives may not have all of the tools (e.g., template correspondence, merchant-specific research, consumer demand data, etc.) necessary to craft a high quality outreach campaign. The inventors have determined that, even where sales representatives ostensibly have access to specialized tools and data, the manual nature of traditional merchant outreach efforts often results in a failure to maximally leverage these tools and data during the merchant outreach process.

The inventors have therefore determined that existing manual and electronic systems for communication outreach fail to maximize the potential opportunities available to promotion and marketing services. As a result of these problems and others, inefficiencies and lost opportunities have been endemic to the process by which promotion and marketing services generate merchant partnerships.

Since the creation and sale of promotions is a relatively new marketplace, the methods and processes for creating new promotions are constantly advancing, and the electronic marketing information collected from such promotions continually becomes more detailed and expansive. Increased variety of promotion types and industries within which promotions are offered present unique challenges for the generation of marketing campaigns, as an automated system may require constant revision to hit a "moving target" representing the optimal cadence for merchant correspondence with any particular merchant. Different merchant types and promotion categories often necessitate different techniques for merchant outreach, such that a single automated system may not provide a "one size fits all" solution for developing new merchant partnerships.

To this end, the inventors have realized that while consumer outreach is often highly strategic and data-based, merchant outreach efforts are often ad hoc and inconsistent, and may fail to maximize the partnership opportunities. Accordingly, by optimizing the use of electronic marketing information and business analytic data, repurposed and analysed to develop sales intelligence data, a promotion and marketing service can scale the throughput of its merchant outreach efforts without requiring additional manpower. In fact, in many respects, less manpower is needed because outreach efficiency can be improved. Embodiments disclosed herein leverage the increasing amount and variety of electronic marketing information and business analytic data, and utilize the diverse modes of communicating with merchants to develop merchant marketing campaigns that maximize the likelihood of positive merchant engagement.

Various embodiments of the present invention are directed to improved apparatuses, methods, and computer readable media for automating the development of merchant-specific outreach campaigns based, in some examples, on a three-part foundation: improved segmentation of merchants into categories, improved content harvesting of sales intelligence data, and improved identification of triggering events that positively correlate with merchant receptivity. As further demonstrated, utilizing embodiments of the present invention disclosed herein, example merchant-specific marketing campaigns can be highly personalized, in cadence and in content, based on the merchant segments, sales intelligence data, and triggering events.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives may access a promotion and marketing service 102 via a network 108 (e.g., the Internet, or the like) using computer devices 110A through 110N. Similarly, merchants may interact with the promotion and marketing service 102 using computer devices 112A through 112N, and consumers may interact with the promotion and marketing service 102 using computer devices 114A through 114N. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the sales representative devices 110A-110N, the merchant devices 112A-112N, and the consumer devices 114A-114N. For example, the server 104 may be operable to receive and process clickstream data provided by the consumer devices 114 and/or the merchant devices 112. The server 104 may also facilitate e-commerce transactions based on transaction information provided by the consumer devices 114 and/or the merchant devices 112. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, sales representatives, merchants, and consumers, data indicating the products and promotions offered by the promotion and marketing service, electronic marketing information (e.g., clickstream data, transaction data, location data, communication channel data, or discretionary data), analytic results, reports, financial data, and/or the like.

The sales representative devices 110A-110N and consumer devices 114A-114N may be embodied by any computing devices known in the art. Electronic data received by the server 104 from the sales representative devices 110A-110N and consumer devices 114A-114N may be provided in various forms and via various methods. For example, the sales representative devices 110A-110N and consumer devices 114A-114N may include desktop computers, laptop computers, smartphones, netbooks, tablet computers, wearable devices, or the like. The information may be provided through various sources on these consumer devices.

In embodiments where a sales representative device 110 or a consumer device 114 is a mobile device, such as a smart phone or tablet, the mobile device may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

In the case of a consumer device 114, the promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the sales representative device 110 and consumer device 114 may interact through the promotion and marketing service 102 via a web browser. As yet another example, the sales representative device 110 and consumer device 114 may include various hardware or firmware designed to interface with the promotion and marketing service 102 (e.g., where the sales representative device 110 or consumer device 114 is a purpose-built device offered for the primary purpose of communicating with the promotion and marketing service 102, such as a store kiosk).

The merchant devices 112A-112N may be any computing device as known in the art and operated by a merchant. For example, the merchant devices 112A-112N may include a merchant point-of-sale device, a merchant e-commerce server, a merchant inventory system, a computing device accessing a web site designed to provide merchant access (e.g., a smartphone, PDA, or desktop computer configured to access a web page via a browser using a set of merchant account credentials), or even a standard telephone. Electronic data received by the promotion and marketing service 102 from the merchant devices 112A-112N may be provided in various forms and via various methods. For example, the merchant devices 112A-112N may provide real-time transaction and/or inventory information as purchases are made from the merchant. In other embodiments, the merchant devices 112A-112N may be employed to provide information to the promotion and marketing service 102 to enable the promotion and marketing service 102 to generate promotions or other marketing information to be provided to consumers. Similarly, the merchant devices 112A-112N may receive data, such as business analytic data, compensation data, or marketing outreach communications from the promotion and marketing service 102 and/or a sales representative device 110A-110N.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, content harvesting circuitry 210, segmentation circuitry 212, trigger detection circuitry 214, and campaign generation circuitry 216, which may in turn include a cadence manager 218. The apparatus 200 may be configured to execute the operations described above with respect to FIG. 1 and below with respect to FIGS. 4-10. Although these components 202-218 are described with respect to functional limitations, it should be understood that the particular implementations necessarily include the use of particular hardware. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Content harvesting circuitry 210 includes hardware configured to harvest sales intelligence data. In this regard, the content harvesting circuitry 210 may collect electronic marketing information from consumer devices 114A-114N and merchant devices 112A-112N, and may collect sales intelligence data from sales representative devices 110A-110N, merchant devices 112A-112N, and/or consumer devices 114A-114N. In some embodiments, the content harvesting circuitry 210 may analyze the collected data to generate business analytic data, and may use the electronic marketing information and business analytic data to generate sales intelligence data. In this regard, the content harvesting circuitry 210 may generate the sales intelligence data periodically via batch processing, or may alternatively generate the sales intelligence data dynamically in response to a request by a sales representative or the occurrence of a triggering event. In either case, the sales intelligence data may relate to particular merchants or merchant segments. For instance, content harvesting circuitry 210 may operate in response to identification of a merchant target (e.g., as selected via campaign generation circuitry 216) to collect merchant-specific sales intelligence data. Similarly, identification of merchant segments of interest (e.g., as selected via campaign generation circuitry 216) may prompt content harvesting circuitry 210 to predictively apply default preferences to a merchant based on the predilections of other merchants classified in the same segment.

Content harvesting circuitry 210 may utilize processing circuitry, such as the processor 202, to perform the above operations, and may utilize memory 204 to store the harvested content (which may include only the sales intelligence data, or which may also include the electronic marketing information and the generated business analytic data). In some embodiments where the content harvesting circuitry 210 performs batch processing to generate sales intelligence data, the content harvesting circuitry 210 may, when instructed, simply retrieve some or all of the harvested content from database 106 of the promotion and marketing service 102, in cases where the relevant electronic marketing information, business analytic data, and sales intelligence data have previously been collected and/or generated. Such embodiments may provide improvements in the speed with which sales intelligence data can be retrieved. It should also be appreciated that, in some embodiments, the content harvesting circuitry 210 may include a separate processor, specially configured field programmable gate array (FPGA), or application specific interface circuit (ASIC) to collect and/or generate the sales intelligence data. The content harvesting circuitry 210 is therefore implemented using hardware components of the apparatus configured by either hardware or software for implementing these planned functions.

Segmentation circuitry 212 includes hardware configured to classify merchants into groups. In this regard, segmentation circuitry 212 may classify merchants based a number of segmentation criteria, such as by promotion type (e.g., rewards, travel, live, or the like), location, language, the types of products or services offered (e.g., Italian restaurants, Greek restaurants, etc.), price (e.g., average price of merchant offerings), or any other product or service focused basis. Segmentation circuitry 212 may also group merchants into segments based on the merchant's history of collaboration with the promotion and marketing service (e.g., merchants that currently partner with the promotion and marketing service, merchants that have partnered with the promotion and marketing service historically but who are not currently partners, or merchants that have never partnered with the promotion and marketing service), the merchant's history of collaboration with other promotion and marketing services, or based on any other electronic marketing information, business analytic data, or sales intelligence data retrieved by the content harvesting circuitry 210, such as merchant goals or needs (e.g., merchants having return-on-investment concerns, merchants having capacity concerns, merchants having brand concerns, etc.). Moreover, segmentation circuitry 212 may further segment merchants based on the personal characteristics of merchant representatives (e.g., proficiency with technology, languages spoken, modes of preferred correspondence, or any other personal information that might be useful for communicating with the merchant representative). In this regard, merchant segmentation may be based on a proprietary taxonomy developed by the promotion and marketing service. Segmentation circuitry 212 may classify merchants into different segments in response to a query (e.g., a request for merchants having a particular characteristic), at periodically spaced intervals (e.g., once per week), or as a follow-on procedure to the harvesting of content by content harvesting circuitry 210 or the identification of a triggering event by trigger detection circuitry 214.

Segmentation circuitry 212 may utilize processing circuitry, such as the processor 202, to classify merchants into different segments, and may utilize memory 204 to retrieve the merchant-specific information forming the basis of the segmentation. It should also be appreciated that, in some embodiments, the segmentation circuitry 212 may include a separate processor, specially configured field programmable gate array (FPGA), or application specific interface circuit (ASIC) to classify merchants into different segments based on the content harvested by the content harvesting circuitry 210. The segmentation circuitry 212 is therefore implemented using hardware components of the apparatus configured by either hardware or software for implementing these planned functions.

Trigger detection circuitry 214 includes hardware configured to identify the occurrence of triggering events meriting merchant outreach. Trigger detection circuitry 214 generates a set of triggering events based on the electronic marketing information, business analytic data, sales intelligence data, and/or any a priori knowledge regarding a particular merchant or merchant segment for which triggering events are sought. To this end, trigger detection circuitry 214 may generate a triggering event database including all possible triggering events, of which sets of triggering events may be identified in accordance with their relevance to particular merchants, merchant segments, potential promotions, or sales representatives. Triggering detection circuitry 214 may include a machine learning component that may relate triggering events to new merchants, segments, promotions, or sales representatives based on similar triggering events having been used for other merchants, segments, promotions, or sales representatives. In this fashion, the set of triggering events relevant to any particular merchant, segment, promotion, or sales representative may grow more complete as new triggering events are added that are relevant to any merchant, segment, promotion, or sales representative.

Subsequently, trigger detection circuitry 214 monitors the electronic marketing information, business analytic data, and sales intelligence data harvested by content harvesting circuitry 210, as well as a predetermined swath of publicly available third party information (e.g., information regarding promotions listed on competing promotion and marketing services, merchant availability information on third party applications such as OpenTable®, information regarding new merchant openings), and calendar events (e.g., changes of season, holidays, user-defined trigger dates/times, or otherwise noteworthy dates) to identify the occurrence of triggering events (e.g., through the output of an alert, message, or other transmission). In embodiments where only particular merchants, segments, promotions, or sales representatives are involved, the set of triggering events that may be identified by trigger detection circuitry 214 may only be a relevant subset of the triggering events stored in the triggering event database.

While content harvesting circuitry 210 is designed to collect and store electronic marketing information, business analytic data, and sales intelligence data for subsequent use in merchant outreach campaigns, trigger detection circuitry 214 monitors this internal data, and also collects and analyzes external data, but does not necessarily store the collected external data. For instance, trigger detection circuitry 214 may deploy a web crawler to monitor a targeted set of hyperlinks for particular keywords indicative of a potentially important triggering event. In this regard, trigger detection circuitry 214 may monitor promotions listed by competitor promotion and marketing services. Similarly, trigger detection circuitry 214 may monitor social network activity (e.g., Twitter®, Facebook®, or the like) to identify trends in products or services based on consumer demand or new merchant offerings.

Trigger detection circuitry 214 may utilize processing circuitry, such as the processor 202, to perform the above monitoring operations, and may utilize memory 204 to retrieved internal data (which may include only the sales intelligence data, or which may also include the electronic marketing information and business analytic data), and to store the triggering event database. While trigger detection circuitry 214 is designed to automatically identify triggering events, on occasion a sales representative or other users (e.g., consumers or merchants interacting with the promotion and marketing service) may separately identify triggering events. Accordingly, trigger detection circuitry 214 may additionally utilize input/output circuitry 206 and/or communications circuitry 208 to retrieve manually-identified triggering events. It should also be appreciated that, in some embodiments, the trigger detection circuitry 214 may include a separate processor, specially configured field programmable gate array (FPGA), or application specific interface circuit (ASIC) to collect and/or generate the sales intelligence data. The trigger detection circuitry 214 is therefore implemented using hardware components of the apparatus configured by either hardware or software for implementing these planned functions.

Campaign generation circuitry 216 includes hardware configured to design and implement a merchant outreach campaign. In this regard, campaign generation circuitry 216 may develop merchant-specific marketing materials using the sales intelligence data, electronic marketing information, and business analytic data retrieved by content harvesting circuitry 210. For example, the sales intelligence data may include information that a merchant representative disregards most email communication. As a result, campaign generation circuitry 216 might design an outreach campaign for the merchant that avoids email correspondence. Given the variety of other automated modes of communication (e.g., text, robo-call, social media messaging, mail, website advertisement or the like), campaign generation circuitry 216 would thus customize a campaign for the merchant using alternative modes of communication based on known preferences of the merchant representatives.

Similarly, campaign generation circuitry 216 may take into account the needs and goals of a merchant when designing a merchant outreach campaign. For instance, the relevant sales intelligence data may indicate that a merchant may be most interested in offering promotions when consumer demand on a promotion and marketing service is high. Accordingly, the campaign generation circuitry 216 may accommodate this desire by modifying business rules that govern the identification of triggering events to include a triggering event upon the identification of increased consumer demand for a product or service offered by the merchant. When the sales intelligence data includes a relative dearth or absence of information regarding a merchant target, the campaign generation circuitry 216 may generate a merchant outreach campaign based on the campaigns generated for similar merchants, or in the absence of any such data, based on generic templates historically used by the promotion and marketing service 102. In this fashion, while merchant-specific information can improve the effectiveness of an outreach campaign, a lack of merchant-specific information will not prevent the automated generation of a merchant-specific campaign. It will be understood that campaign generation circuitry 216 may further perform many other types of merchant-specific tailoring of outreach correspondence, as will be demonstrated in conjunction with additional examples in greater detail below.

While campaign generation circuitry 216 may typically generate fully-automated merchant correspondence, in some embodiments the campaign generation circuitry 216 may utilize a wider variety of communication modes, such as by employing sales representatives to contact merchants directly by phone, email, text, or mail, or even in person. Furthermore, a combination of manual and automated merchant outreach efforts may in many cases produce a more effective marketing effort than fully-automated or fully manual outreach alone.

Campaign generation circuitry 216 may further design not just overt solicitations to merchants, but may also develop educational materials that may generate goodwill and credibility and build a foundation for future partnerships. In this regard, in many cases the sequence of correspondence with a merchant can transform a poorly performing merchant outreach campaign into a successful one. Accordingly, in some embodiments campaign generation circuitry 216 may include a cadence manager 218 to develop a sequence of correspondence and to track the various outreach correspondence targeted to an individual merchant. When included in the apparatus 200, the cadence manager 218 comprises hardware configured to track each merchant outreach communication and initiate new merchant outreach correspondence at appropriate intervals. In some embodiments, cadence manager 218 may instruct trigger detection circuitry 214 to include one or more triggering events corresponding to the desired cadence of merchant correspondence. For instance, when a campaign calls for correspondence including educational materials and follow-up correspondence at a specific time interval, cadence manager 218 may instruct trigger detection circuitry 214 to identify occurrence of a triggering event at the appropriate time. In embodiments in which personal contact (e.g., direct contact by a sales representative in person or by phone, email, text, or mail) is warranted, cadence manager 218 may utilize communications circuitry 208 to issue an instruction to the relevant sales representative. Accordingly, campaign generation circuitry 216 and cadence manager 218 are configured to design and deploy a campaign in response to a query from a user (e.g., a sales representative), at periodically spaced intervals (e.g., once per week), or in response to the occurrence of a triggering event identified by trigger detection circuitry 214.

Campaign generation circuitry 216 and cadence manager 218 may utilize processing circuitry, such as the processor 202, and communication circuitry, such as input/output circuitry 206 and the communications circuitry 208, to perform the above operations, and may utilize memory 204 to populate merchant-specific messages based on the content harvested by content harvesting circuitry 210 (which may include only the sales intelligence data, or which may also include the electronic marketing information and business analytic data). It should also be appreciated that, in some embodiments, the campaign generation circuitry 216 and cadence manager 218 may be embodied by a separate processor, specially configured field programmable gate array (FPGA), or application specific interface circuit (ASIC) to design and deploy merchant outreach campaigns. The campaign generation circuitry 216 and cadence manager 218 are therefore implemented using hardware components of the apparatus configured by either hardware or software for implementing these planned functions.

It should be understood that the circuitry of apparatus 200 may operate in multiple different sequences. For instance, content harvesting circuitry 210, segmentation circuitry 212, and trigger detection circuitry 214 may be initiated (in any order), and campaign generation circuitry 216 may be initiated only subsequently in response to the occurrence of a triggering event (as identified by trigger detection circuitry 214). In alternative embodiments, campaign generation circuitry 216 may be initiated prior to trigger identification, and in yet further embodiments, may be initiated even before the collection of sales intelligence data by content harvesting circuitry 210 or the classification of merchants into various merchant segments by segmentation circuitry 212. As a result, apparatus 200 is configured to generate merchant outreach campaign in multiple ways, such as by analyzing sales intelligence data to identify promising merchant targets (after which campaign generation circuitry 216 is initiated) or by identifying a merchant target a priori, in which case campaign generation circuitry 216 may be initiated first, and the collection of sales intelligence data and monitoring of triggering events are specific to the predetermined merchant target.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The sales representative device(s) 110, merchant device(s) 112, and consumer device(s) 114 may be embodied by one or more computing systems, such as apparatus 300 shown in FIG. 3. As illustrated in FIG. 3, the apparatus 300 may include a processor 302, a memory 304, an input/output circuitry 306, and a communications circuitry 308. As it relates to operations described in the present invention, the functioning of the processor 302, the memory 304, the input/output circuitry 306, and the communication circuitry 308 may be similar to the similarly named components described above with respect to FIG. 2, and for the sake of brevity, additional description of the mechanics of these components is omitted. Nevertheless, these device elements, operating together, provide the apparatus 300 with the functionality necessary to facilitate the communication of data (e.g., electronic marketing information, business analytic data, sales intelligence data, or the like) between a user (e.g., a sales representative, merchant, or consumer) and the promotion and marketing service 102, as described in greater detail below in conjunction with FIG. 5.

Example Service Data Flow

FIG. 4 depicts an example data flow 400 illustrating interactions between a server 402, one or more consumer devices 404, and one or more merchant devices 406. The server 402 may be implemented in the same or a similar fashion as the server 104 as described above with respect to FIG. 1, the one or more consumer devices 404 may be implemented in the same or a similar fashion as the consumer devices 114A-114N as described above with respect to FIG. 1, and the one or more merchant devices 406 may be implemented in the same or a similar fashion as the merchant devices 112A-112N as described above with respect to FIG. 1.

The data flow 400 illustrates how electronic information may be passed among various systems when employing a server 402 in accordance with embodiments of the present invention. The one or more consumer devices 404 and/or one or more merchant devices 406 may provide a variety of electronic marketing information to the server 402 for use in providing promotion and marketing services to the consumer. This electronic marketing information may include, but is not limited to, location data, clickstream data, transaction data, communication channel data, and/or discretionary data. It should also be appreciated that the electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data. In addition, the one or more consumer devices 404 and/or one or more merchant devices 406 may provide sales intelligence data to the server 402.

As a result of transactions performed between the one or more consumer devices 404 and the server 402, the server 402 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 404 offered by the server 402, the server 402 may leverage information provided by the consumer devices to improve the relevancy of marketing communications to individual consumers or groups of consumers. In this manner, the server 402 may determine promotions, goods, and services that are more likely to be of interest to a particular consumer or group of consumers based on clickstream data, location data, and other information provided by and/or relating to particular consumers. For example, the server 402 may detect the location of a consumer based on location data provided by the consumer device, and offer promotions based on the proximity of the consumer to the merchant associated with those promotions.

Alternatively, the server 402 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 402 for the purpose of improving the relevancy of marketing communications.

Moreover, server 402 may determine whether sales intelligence data is received from the consumer, and if so, this fact may favorably affect the nature and/or quality of electronic marketing information transmitted to a consumer device 404. As noted previously, the promotion and marketing service 102 may prioritize the collection of sales intelligence data from third party sources such as consumers by offering incentives in exchange for the provision of sales intelligence data (e.g., more favorable terms in electronic marketing information).

It should also be appreciated that the server 402 may also control other factors of the electronic marketing communications sent to the consumer other than the particular promotions included in the electronic marketing communication. For example, the server 402 may determine the form, structure, frequency, and type of the electronic marketing communication. As with the content of the electronic marketing communication, these factors may be programmatically determined according to various methods, factors, and processes based on electronic data received by the server 402 for the purpose of maximize the likelihood that the communication will be relevant to the recipient consumer.

The server 402 interactions with the one or more merchant devices 406 may be related to enabling the merchant to market their products using a promotion and marketing service. For example, the one or more merchant devices 406 may provide promotion data defining one or more promotions to be offered by the promotion and marketing service on behalf of the merchant. The server 402 may receive this information and generate information for providing such promotions via an e-commerce interface, making the promotions available for purchase by consumers. The server 402 may also receive information about products from the one or more merchant devices 406. For example, a merchant may provide electronic marketing information indicating particular products, product prices, inventory levels, and the like to be marketed via a promotion and marketing service. The server 402 may receive this information and generate listing information to offer the indicating products to consumers via a promotion and marketing service.

The one or more merchant devices 406 may also receive information from the server 402. For example, in some embodiments a merchant may obtain access to certain business analytic data aggregated, generated, or maintained by the server 402. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 406 may also receive electronic compensation data from the server 402. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

The one or more merchant devices 406 may also receive outreach communications from the server 402. For example, the promotion and marketing service may communicate with a merchant who offers a product or service for which the promotion and marketing service identifies a potentially beneficial business relationship. After design of a merchant outreach campaign, a promotion and marketing service may initiate automated correspondence with the merchant in an attempt to secure a prospective business relationship. In some embodiments, the promotion and marketing service may enlist the aid of one or more sales representative, via sales representative devices 110A-110N (not shown in FIG. 4), to facilitate the flow of data between the server 402 and the merchant devices via manual interaction with the merchant device (e.g., by phone, email, or text).

Embodiments advantageously provide improvements to server 402 by improving the success-rate of merchant communication and thus increasing the operating efficiency of the server 402. More specifically, through the collection of electronic marketing information and generation of business analytic data, the server 402 is able to develop sales intelligence data that improves the effectiveness of merchant outreach campaigns. By enabling consumer and merchant devices to contribute sales intelligence data, and by providing server 402 with the hardware capability to generate this sales intelligence data, embodiments described herein avoid the bottleneck caused by undue reliance on sales representative interaction.

Example Operations Performed by the Promotion and Marketing Service

Having described the circuitry comprising embodiments of the present invention, it should be understood that the promotion and marketing service 102 may advantageously deploy a merchant outreach campaign in a number of ways. FIG. 5 broadly illustrates a flowchart containing a series of operations performed to generate template merchant outreach campaigns, in accordance with example embodiments described herein. The operations illustrated in FIG. 5 may, for example, be performed by a promotion and marketing service 102, with the assistance of, and/or under the control of apparatus 200.

In operation 502, apparatus 200 includes means, such as content harvesting circuitry 210, for harvesting sales intelligence data. As described above, this sales intelligence data may include or may be based on electronic marketing information collected from one or more merchant devices 112, consumer devices 114, from a third party source or the like. Moreover, the sales intelligence data may itself be retrieved directed from one or more sales representative devices 110, merchant devices 112, or consumer devices 114. Additionally or alternatively, the sales intelligence data may be generated based on business analytic data developed by the promotion and marketing service 102.

In operation 504, the apparatus 200 further includes means, such as segmentation circuitry 212 or the like, for generating merchant segments. In this regard, the segmentation circuitry 212 may classify different merchants based a number of segmentation criteria, such as by promotion type, location, language, the types of products or services offered, price, or any other product or service focused basis. Segmentation circuitry 212 may also group merchants into segments based on the merchant's history of collaboration with the promotion and marketing service, the merchant's history of collaboration with other promotion and marketing services, or based on any other electronic marketing information, business analytic data, or sales intelligence data retrieved by the content harvesting circuitry 210, such as merchant goals or needs. Moreover, segmentation circuitry 212 may further segment merchants based on the personal characteristics of merchant representatives.

In operation 506, the apparatus 200 may include means, such as trigger detection circuitry 214, for detecting triggering events. As is described in greater detail in the Example Apparatus section above, trigger detection circuitry 214 may generate a triggering event database, and then may develop subsets of triggering events for any given merchant or merchant segment.

Finally, in operation 508, the apparatus 200 may include means, such as campaign generation circuitry 216 and cadence manager 218, for assembling template campaigns, as will be described in greater detail below.

Turning now to FIG. 6, a flowchart is shown containing a series of operations for harvesting sales intelligence content, in accordance with example embodiments described herein. The operations illustrated in FIG. 6 may, for example, be performed by a promotion and marketing service 102, with the assistance of, and/or under the control of apparatus 200.

In operation 602, apparatus 200 includes means, such as content harvesting circuitry 210, for initiating a sales intelligence data harvesting procedure. In operation 604, apparatus 200 includes means, such as content harvesting circuitry 210, for determining whether one or more merchant or segment targets have been identified. In embodiments in which targets have not been identified, content harvesting circuitry 210 proceeds to operations 606-610 to perform global content harvesting. In embodiments in which targets have been identified (e.g., one or more merchants, one or more merchant segments, or the like), content harvesting circuitry 210 proceeds to operations 612-616 to perform tailored content harvesting operations.

In operation 606, occurring when targets have not been identified, the content harvesting circuitry 210 may collect electronic marketing information. This information, as noted previously, may include clickstream data, location data, communication channel data, and discretionary data provided from a consumer or merchant device. In some embodiments, electronic marketing information may have been previously stored by the promotion and marketing service 102, such as in database 106. Accordingly, in an instance in which the electronic marketing information has previously been harvested, content harvesting circuitry 210 may retrieve the electronic marketing information from memory, from a remote data center or the like.

Thereafter, in operation 608, the apparatus 200 may include means, such as content harvesting circuitry 210, for generating business analytical data. In this regard, content harvesting circuitry 210 may generating this business analytic data based on the electronic marketing information. As described previously, by harvesting the electronic marketing information, content harvesting circuitry 210 may use a variety of data analysis techniques to identify correlations, relationships, and other associations among elements of electronic marketing information. One type of business analytic data generated by the content harvesting circuitry 210 may be consumer demand data. For instance, the promotion and marketing service may analyze the electronic marketing information to identify an increased demand for a particular product or service. Other types of business analytic data may include key metrics tracing the performance of promotions for products or services similar to those offered by a merchant or the performance of promotions offered via the promotion and marketing service versus promotions of a competitor service.

Finally, in operation 610, the apparatus 200 may include means, such as content harvesting circuitry 210, for generating sales intelligence data. In some embodiments, content harvesting circuitry 210 may generate this sales intelligence data based on the electronic marketing information and/or the business analytic data. In some such embodiments, the electronic marketing information and/or business analytic data may, without alteration, also be considered sales intelligence data. For instance, the aforementioned consumer demand or key metrics may comprise business analytic data, but may simultaneously comprise valuable sales intelligence data that may inform merchant outreach campaigns. In other embodiments, content harvesting circuitry 210 may collect sales intelligence data directly from sales representative devices, merchant devices, or consumer devices. As noted previously, such users may provide this sales intelligence data via completion of a form or survey on a website or application hosted by the promotion and marketing service to generate this data.

In operation 612, on the other hand, targets have been identified for content harvesting, and the content harvesting circuitry 210 may collect merchant-specific electronic marketing information. This operation is similar to operation 606, except that global content harvesting is no necessary. Content harvesting circuitry 210 collects only the electronic marketing information that is specific to the merchant target or merchant segment target.

Thereafter, in operation 614, the apparatus 200 may include means, such as content harvesting circuitry 210, for generating merchant-specific business analytical data. This operation is similar to operation 608. However, because only merchant-specific electronic marketing information is collected in operation 612, the business analytic data generated by content harvesting circuitry 210 is based on merchant-specific electronic marketing information, and therefore comprises merchant-specific business analytic data.

Finally, in operation 616, the apparatus 200 may include means, such as content harvesting circuitry 210, for generating merchant-specific sales intelligence data. This operation is similar to operation 610. Because only merchant-specific electronic marketing information and business analytic data are precursor inputs, in embodiments where the content harvesting circuitry 210 generates the sales intelligence data, this sales intelligence data is necessarily merchant-specific as well. In embodiments where content harvesting circuitry 210 collects sales intelligence data directly from sales representative devices, merchant devices, or consumer devices, the collected data comprises only merchant-specific sales intelligence data. Notably, in some embodiments, content harvesting circuitry 210 may collect sales intelligence content for all selected merchant targets (or merchant segment targets) simultaneously. However, in other embodiments, content harvesting circuitry 210 may collect sales intelligence content for a single merchant at a time. In such embodiments, completion of operation 616 may prompt content harvesting circuitry 210 to return to operation 612 to harvest content regarding other selected merchant targets (or merchant segment targets).

Turning now to FIG. 7, a flowchart is shown containing a series of operations performed to classify merchants into groups, in accordance with example embodiments described herein. The operations illustrated in FIG. 7 may, for example, be performed by a promotion and marketing service 102, with the assistance of, and/or under the control of apparatus 200.

In operation 702, apparatus 200 includes means, such as segmentation circuitry 212, for initiating a sales intelligence data harvesting procedure. In operation 704, apparatus 200 includes means, such as segmentation circuitry 212, for determining whether segmentation criteria have been identified. In a typical case, such criteria may be received from other circuitry of the apparatus 200 (e.g., campaign generation circuitry or the like), but the segmentation criteria may instead be received from an external source via a network interface (e.g., communication circuitry 208), or even based on user input via input/output circuitry 206. The term "segmentation criteria" refers to criteria that form the basis of merchant groupings (e.g., promotion type, location, products/services offered, price, merchant history, merchant demographic information, or the like). In embodiments in which segmentation criteria have not been identified, segmentation circuitry 12 proceeds to operation 706 to identify possible segmentation criteria. In embodiments in which one or more segmentation criteria have been identified, content harvesting circuitry 210 proceeds to operations 708.

In operation 706, the apparatus 200 includes means, such as segmentation circuitry 212, for identifying possible merchant segmentation criteria. In this regard, segmentation circuitry 212 may determine the merchant segmentation criteria based on at least one of the stored electronic marketing information, business analytic data, and sales intelligence data. While internal segmentation criteria (e.g., promotion type, location, language, etc.) can be easily identified, additional segmentation criteria may be identified based on a holistic analysis of the electronic marketing information, business analytic data, and sales intelligence data. To this end, while any discrete piece of information may not be noteworthy, particular combinations of electronic marketing information, business analytic data, and sales intelligence data can be instructive. For instance, the business analytic data may identify high consumer demand for a number of products or services. Segmentation circuitry 212 may thus identify high consumer demand as a possible merchant segmentation criterion.

Turning to operation 708, the apparatus 200 may include means, such as segmentation circuitry 212 for initiating the harvesting of content relevant to the identified merchant segmentation criteria. In this regard, this operation may invoke content harvesting circuitry 210 to perform merchant-specific content harvesting in the manner discussed previously.

Finally, in operation 708, the apparatus 200 may include means, such as segmentation circuitry 212 or the like, for classifying merchants based on the identified segmentation criteria and the harvested content. In some embodiments, segmentation circuitry 212 may store the resulting merchant groupings in a relational database in memory 204 or the like, for future retrieval and manipulation by the apparatus 200.

Turning now to FIG. 8, a flowchart is shown containing a series of operations for monitoring the occurrence of triggering events, in accordance with example embodiments described herein. The operations illustrated in FIG. 8 may, for example, be performed by a promotion and marketing service 102, with the assistance of, and/or under the control of apparatus 200.

In operation 802, apparatus 200 includes means, such as trigger detection circuitry 214, for initiating a triggering event monitoring procedure. In operation 804, apparatus 200 includes means, such as trigger detection circuitry 214, for determining whether a set of triggering events have been identified. In a typical case, such triggering events may be retrieved from a triggering event database, but the triggering events may also be received from other circuitry of the apparatus 200 (e.g., cadence manager 218), from an external source via a network interface (e.g., via communication circuitry 208), or even based on user input received via input/output circuitry 206. In some embodiments, a global set of triggering events may be warranted, such as in cases where no specific merchant targets have yet been identified. On other embodiments where one or more merchant target (or merchant segment target) has been identified, the set of triggering events may comprise a subset of all of the triggering events stored in triggering event database. In embodiments in which the triggering events have not been identified (e.g., a merchant target exists, but no related triggering events are known), trigger detection circuitry 214 proceeds to operation 806 to identify possible segmentation criteria. In embodiments in which one or more triggering events are known (e.g., a situation where a global triggering event monitoring is desired), trigger detection circuitry 214 proceeds to operations 808.

In operation 806, the apparatus 200 may include means, such as trigger detection circuitry 214 or the like, for identifying triggering events. In this regard, trigger detection circuitry 214 may identify triggering events based on sales intelligence data. In some embodiments, trigger detection circuitry 214 may additionally use the electronic marketing information and business analytic data identify triggering events. To this end, as noted previously trigger detection circuitry 214 may generate a triggering event database including all possible triggering events. While at some point, triggering events may be entered by a user or external source, once entered into the triggering event database triggering detection circuitry 214 may include a machine learning component that can relate existing triggering events to new merchants or segments based on these triggering events having been used for other merchants, segments in the past. In this fashion, the set of triggering events relevant to any particular merchant, segment, promotion, or sales representative may grow more complete as new triggering events are added that are relevant to any merchant, segment, promotion, or sales representative.

Some example triggering events that may originally be included in the triggering event database may include: identification of products or services in high demand in the promotion and marketing service; conclusion of a promotion on a competitor promotion and marketing service (that performed either well or poorly); advertisements on social media; service availability on a particular day (e.g., large blocks of availability on OpenTable®); predetermined period of time that has elapsed since a prior merchant outreach campaign (which was or was not successful; recently opened merchant location; conclusion of a competitor promotion that performed well; identification of a merchant that had run a promotion previously but did not re-feature the promotion; identification of merchant that has never been contacted; pausing of an existing promotion; seasonal factors (e.g., prime season is approaching or almost concluding); identification of a merchant that started generating a promotion but never finished the process; or hyperlocal proximity to content featured by the promotion and marketing service.

Turning to operation 808, the apparatus 200 may include means, such as trigger detection circuitry 214, for collecting internal and external data. Internal data may comprise the electronic marketing information, business analytic data, and sales intelligence data. This data may be refreshed by invoking content harvesting circuitry 210, in which case the trigger detection circuitry 214 may further provide content harvesting circuitry 210 with a set of merchants for which triggering events are requested. External data may comprise a predetermined swath of publicly available third party information (e.g., information regarding promotions listed on competing promotion and marketing services, merchant availability information on third party applications such as OpenTable®, information regarding new merchant openings), For instance, trigger detection circuitry 214 may deploy a web crawler to monitor a targeted set of hyperlinked websites for particular keywords indicative of a potentially important triggering event. In this regard, trigger detection circuitry 214 may monitor promotions listed by competitor promotion and marketing services. Similarly, trigger detection circuitry 214 may monitor social network activity (e.g., Twitter®, Facebook®, or the like) to identify trends in products or services based on consumer demand or new merchant In operation 810, the apparatus 200 may include means, such as trigger detection circuitry 214, for analysing the internal and external data for occurrence of triggering events. Subsequently, in operation 812, trigger detection circuitry 214 determines whether or not a triggering event has occurred. If no triggering events have occurred, the procedure loops back to operation 808 to collect data again and re-evaluate, thus establishing continual monitoring of triggering events.

If a triggering event has occurred, in operation 814 trigger detection circuitry 214 alerts campaign generation circuitry 216 to either begin or continue the merchant outreach campaign, which is discussed in greater detail in conjunction with FIG. 9.

Turning now to FIG. 9, a flowchart is shown containing a series of operations performed for implementing a merchant outreach campaign, in accordance with example embodiments described herein. The operations illustrated in FIG. 9 may, for example, be performed by a promotion and marketing service 102, with the assistance of, and/or under the control of apparatus 200.

In operation 902, apparatus 200 invokes campaign generation circuitry 216 to initiate generation of an automated merchant outreach campaign directed to a target merchant. In operation 904, the apparatus 200 includes means, such as campaign generation circuitry 216 for generating a correspondence template. This template may vary in a number of ways. For instance, the template may be designed for one of a number of contact modes (e.g., email, text, phone, social media messaging, mail, or website advertisement) that may be preferable for the target merchant. Additionally, the correspondence template may be generated to take into account the needs and goals of a merchant when designing a merchant outreach campaign. For example, sales intelligence data regarding a merchant may indicate that the merchant is unfamiliar with the promotion and marketing service or the types of promotions that might be offered on behalf of the merchant. Accordingly, the campaign generation circuitry 216 may accommodate this fact by designing an educational correspondence template. As noted previously, however, when the sales intelligence data includes a relative dearth or absence of information regarding a merchant target, the campaign generation circuitry 216 may generate a merchant outreach campaign based on the campaigns generated for similar merchants, or in the absence of any such data, based on generic templates historically used by the promotion and marketing service 102. In this fashion, while merchant-specific information can improve the effectiveness of an outreach campaign, a lack of merchant-specific information will not prevent the automated generation of a merchant-specific campaign.

As in the examples above, the correspondence template may be based on sales intelligence data regarding the merchant. To this end, in optional operation 906, the campaign generation circuitry 216 may require the additional harvesting of content to develop the merchant-specific correspondence template. Accordingly, apparatus 200 may invoke content harvesting circuitry 210 to provide sales intelligence data, and optionally to also provide electronic marketing information and business analytic data for use by campaign generation circuitry 216 in the generation of the merchant correspondence template in operation 904.

In operation 908, the apparatus 200 may include means, such as campaign generation circuitry 216 or its sub-unit, cadence manager 218, for generating a correspondence cadence specific to the target merchant. The correspondence cadence may define a framework comprising a sequence and timing of merchant correspondence designed to maximize the effectiveness of a merchant outreach campaign. In some embodiments, the cadence manager 218 also tracks outgoing merchant correspondence and initiates new merchant outreach correspondence at appropriate intervals. In some such embodiments, cadence manager 218 may instruct trigger detection circuitry 214 to include one or more triggering events corresponding to the desired cadence of merchant correspondence. For instance, when a campaign calls for merchant-specific correspondence including educational materials and follow-up merchant-specific correspondence after a predetermined time interval, cadence manager 218 may instruct trigger detection circuitry 214 to identify occurrence of a triggering event at the appropriate time.

In operation 910, the apparatus 200 may include means, such as campaign generation circuitry 216, for retrieving merchant-specific business analytic data. While in some embodiments, this merchant-specific business analytic data may be stored by memory 204 after having previously been retrieved, in other embodiments, the campaign generation circuitry 216 may, in optional operation 912, require the harvesting of additional content to retrieve this business analytic data. Accordingly, apparatus 200 may invoke content harvesting circuitry 210 to provide business analytic data, and optionally to also provide electronic marketing information and business analytic data for use by campaign generation circuitry 216 in the generation of the merchant correspondence template in operation 904.

Turning to operation 914, the apparatus 200 includes means, such as campaign generation circuitry 216, for generating merchant-specific correspondence. In this regard, the campaign generation circuitry 216 populates the merchant-specific correspondence template based on the business analytic data (examples of which are illustrated in FIGS. 11-15), although additional modifications may be necessary based on the content of the business analytic data. For instance, In operation 916, the apparatus 200 may include means, such as campaign generation circuitry 216 or its sub-unit, cadence manager 218, for transmitting the merchant-specific correspondence. Subsequently, in operation 918, the apparatus 200 may include means, such as campaign generation circuitry 216 or its sub-unit, cadence manager 218, for invoking trigger detection circuitry 214 to monitor the occurrence of a subsequent triggering event. As noted previously, cadence manager 218 may instruct trigger detection circuitry 214 to add additional triggering events corresponding to the sequence and timing of the merchant-specific correspondence cadence. Accordingly, based on the nature of the merchant response (or the lack thereof) identified upon occurrence of a triggering event, operations 904-918 may repeat (as many times as is appropriate) to continue the merchant outreach campaign. In this regard, the merchant-specific correspondence cadence may change significantly depending on the nature of the merchant's reaction (or lack thereof). Accordingly, by repeating operations 904-918, it may be possible to dynamically alter a merchant outreach campaign based on the merchant response.

As noted previously, the circuitry of apparatus 200 may operate in multiple different sequences. Turning now to FIG. 10, a flowchart is shown containing a series of operations for generating a merchant outreach campaign, in accordance with example embodiments. The operations illustrated in FIG. 10 may, for example, be performed by a promotion and marketing service 102, with the assistance of, and/or under the control of apparatus 200.

In operation 1002, apparatus 200 includes means, such as processor 202 or campaign generation circuitry 216, for determining whether one or more merchant outreach targets have been identified. As previously noted, apparatus 200 is configured to generate merchant outreach campaign in multiple ways, such as by analyzing sales intelligence data to identify promising merchant targets (after which campaign generation circuitry 216 is initiated) or by identifying a merchant target a priori, in which case campaign generation circuitry 216 may be initiated first, and the collection of sales intelligence data and monitoring of triggering events are specific to the predetermined merchant target. If a merchant target has been identified a priori (e.g., by a sales representative), then the procedure advances to operation 1008. Otherwise, the procedure moves first to operations 1004 and 1006 for merchant target identification.

In operation 1004, the apparatus 200 includes means, such as processor 204, campaign generation circuitry 216, or the like, for invoking segmentation circuitry 212. In turn, segmentation circuitry 212 may operate as discussed previously in accordance with FIG. 7 above. In most such circumstances, this procedure will occur in an instance in which segmentation criteria is not known, although it is should be understood that in some embodiments, segmentation criteria may be known even if specific merchant targets are not (e.g., where the promotion and marketing service may wish to target merchants offering highly demanded products or services, even if the specific products or services in high demand are not yet known).

In operation 1006, the apparatus 200 includes means, such as processor 204, segmentation circuitry 212, or the like, for identifying one or more merchant targets. In this regard, after identification of segmentation criteria, segmentation circuitry 212 or the processor 204 can construct a set of one or more merchants falling within identified segments.

Finally, in operation 1008, the apparatus 200 includes means, such as processor 204 or the like, for initiating campaign generation circuitry 216 to design and deploy a merchant outreach campaign to the one or more merchants identified in operation 1006, as discussed in greater detail above in conjunction with FIG. 9. As shown in FIG. 10, embodiments disclosed herein may present a promotion and marketing service with the opportunity to develop a merchant outreach campaign directed to a target merchant, or may enable broad-based opportunistic merchant target identification.

FIGS. 5-10 illustrate flowcharts of the operation of an apparatus, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

Accordingly, blocks of the flowcharts support combinations of means for performing the specified functions and combinations of operations for performing the specified functions. It will be understood that one or more blocks of the flowcharts, and combinations of blocks in the flowcharts, can be implemented by special purpose hardware-based computer systems which preform the specified functions, or combinations of special purpose hardware and computer instructions.

In some embodiments, certain ones of the operations above may be modified or further amplified. Furthermore, in some embodiments, additional optional operations may be included. Modifications, amplifications, or additions to the operations above may be performed in any order and in any combination.

Example Merchant Outreach Correspondence

As described above, merchant outreach campaigns are designed for merchant acquisition, and embodiments described herein describe the significant variety of merchant-specific correspondence. By way of example, the following illustrative examples of campaigns demonstrate the wide variety of merchant outreach campaigns contemplated by embodiments of the present invention. For instance, some example merchant outreach campaigns may include merchant-specific correspondence regarding: a number of customers searching for a merchant's offerings or directly for that merchant's name (e.g., "540 customers searched for 'pizza' in Wicker Park last week"); the potential opportunity from running a promotion with the promotion and marketing service (e.g., "Golf Courses see an average of $1200 bookings with 20% overspend"); return-on-investment (ROI) graphs illustrating the cost and financial benefit of running a promotion with the promotion and marketing service ("Merchants in your area typically make $7,450 when running a Groupon. Customize the financial breakdown below for your business."); demand information for services the merchant offers in a relevant subdivision (e.g., "Did you know 300 people are searching for Skydiving in your New York right now?"); nearby merchants that the promotion and marketing service has worked with and who have loved their experience ("We have helped these 43 nearby businesses grow and thrive"); customer demographic information for the specific zip code the merchant is located in ("Your customer market report for 60613. Opt in to get future insights about small business trends in your area."); explicitly elicit needs of the promotion and marketing service that may be fulfilled by the merchant ("We have helped thousands of merchants grow in Chicago. How can we help you? 1) I need more high quality customers 2) I want to fill my unused capacity 3) . . . "); and offering an incentive to receive the first N customers with no payment instead of margin negotiation ("Try Groupon Risk Free—First 20 customers free").

Turning now to FIGS. 11-15, examples of merchant-specific correspondence prepared by a promotion and marketing service 102 are illustrated, in accordance with example embodiments of the present invention.

Figure 11:
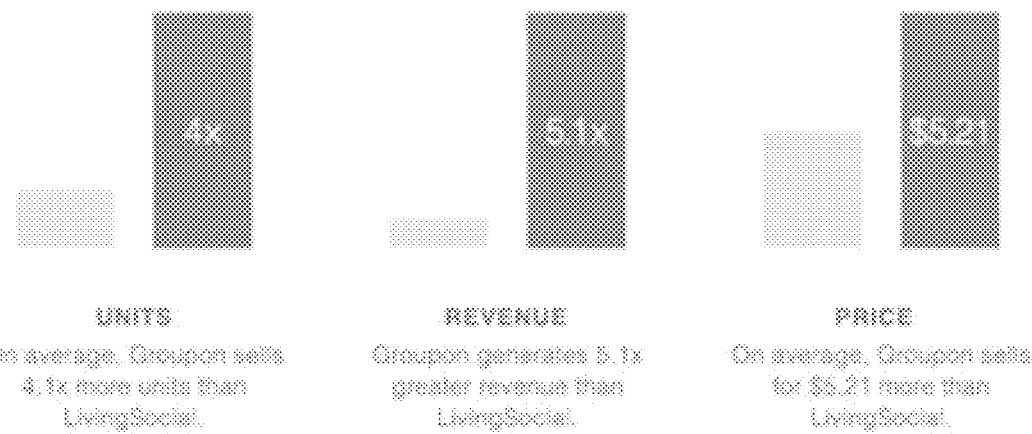

FIG. 11 illustrates an example of an initial merchant-specific correspondence for a campaign in which the triggering event comprises conclusion of a competitor promotion. As shown in FIG. 11, the merchant-specific correspondence may illustrate the localized comparison information of a competitor to the expected results of running a promotion with the promotion and marketing service (e.g., average units sold for service, subscriber reach for city, customer demographic comparison, and the like). The correspondence cadence may include a follow-up communication to list a promotion with the promotion and marketing service and compare the experience.

FIG. 12 illustrates an example of a campaign that might be offered by a promotion and marketing service employing embodiments of the present invention may include educational campaigns to engage merchants about local trends, in which merchants that engage with the material receive a follow up merchant-specific correspondence suggesting a partnership and soliciting the merchant to reach out to a sales representative. Ongoing educational content could include national trends, local trends, unusual promotion structures for the category, consumer demand data organized by area, or the like.

FIG. 13 illustrates an example of a campaign in which the triggering event for the initial merchant-specific correspondence comprises consumer demand for an unfulfilled service. As shown in FIG. 13, this sort of correspondence may show search numbers related to the specific merchant's services. Subsequently, the campaign could merit a monthly follow-up for a set number of months.

Figure 14:

FIG. 14 illustrates an example of a campaign in which the triggering event for the initial merchant-specific correspondence comprises an identification of positive ROI for the merchant. As shown in FIG. 14, this sort of correspondence may show example financial figures illustrating the potential revenue, consumer traffic, overspend potential, and profit possibilities available to the merchant by listing a promotion with the promotion and marketing service. As with the example in FIG. 13 above, the campaign could merit a monthly follow-up for a set number of months.

Figure 15:
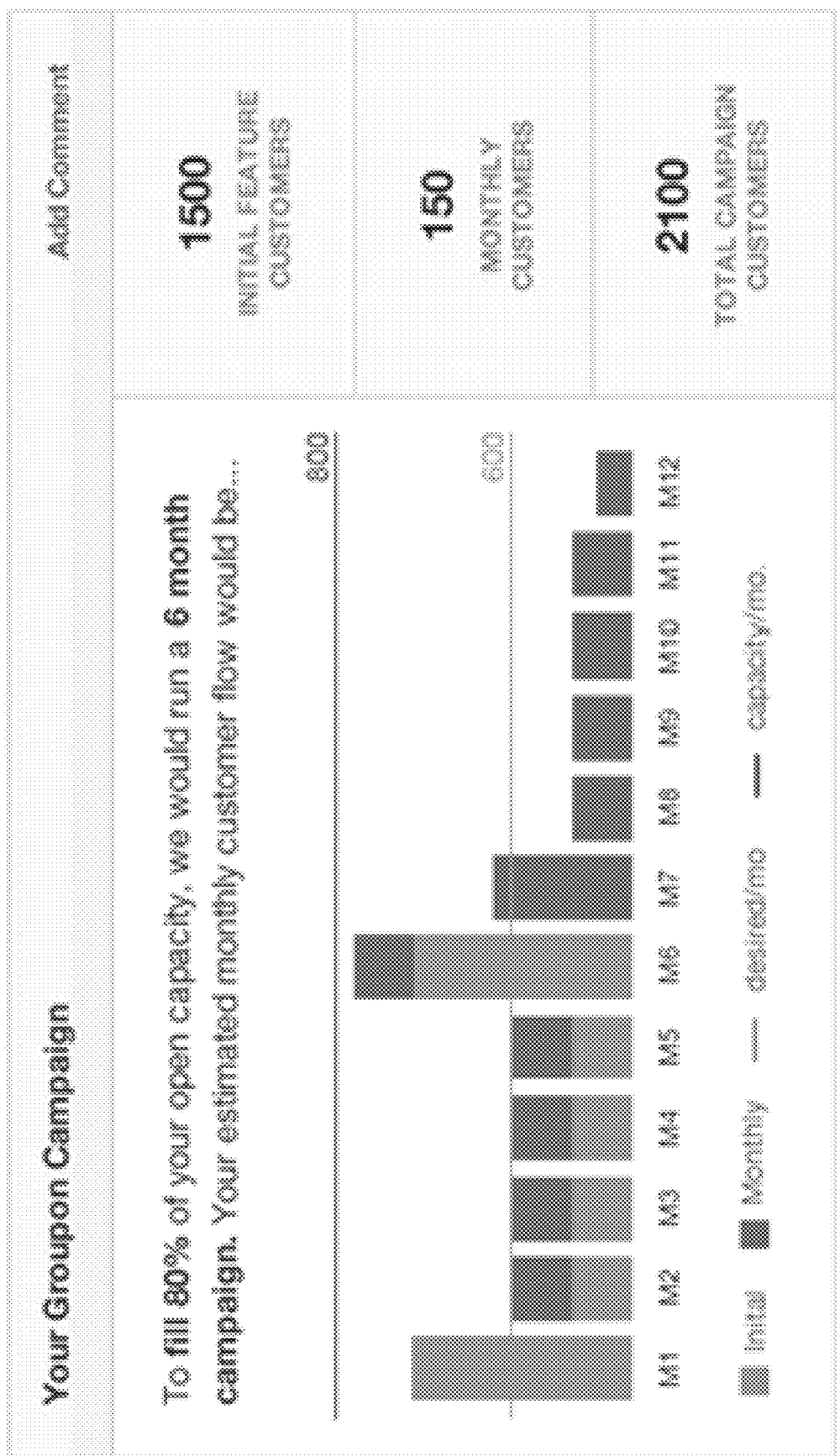

FIG. 15 illustrates an example of a campaign in which the triggering event for the initial merchant-specific correspondence comprises high availability for a service offered by the merchant. As shown in FIG. 15, this sort of correspondence may show open capacity numbers, coupled with the potential capacity resolution offered by partnership with the promotion and marketing service.

Figure 16:

FIG. 16 illustrates an example of a campaign in which the triggering event for the initial merchant-specific correspondence comprises an identification that the target merchant has failed to re-feature a product or service with the promotion and marketing service. The cadence of a campaign of this nature may be periodic (e.g., monthly), to ensure continued contact with the merchant.

Although not shown, another example may comprise merchant-specific correspondence in which the triggering event is a "hot merchant" running a related promotion with the promotion and marketing service nearby. The merchant-specific correspondence may include illustrations of merchant success and geographic proximity.

Examples of text-based emails that may be generated using embodiments described herein are illustrated in-line below. In many cases, text-based emails can be more effective than graphical emails due to their perceived sincerity.

For instance, an example of a text-based e-mail for merchants that have run a promotion but refuse to re-feature with the promotion and marketing service is as follows:

"Hi XXX,
 I hope you're well. I know a few of my reps have reached out to you since the feature you set up with XXX back in early 2012. I was hoping you might be able to provide me with some insight as to how your experience with Groupon went. I'm a Strategic Account Executive here and I've been tasked by our SVP of Sales to re-open conversations with high value attrition merchants such as yourself to get a better understanding of how you're currently operating and why we haven't been able to work together in 2 years.
Regards."

Another text-based e-mail advising merchants regarding consumer demand may be the following:

"Subject: Cuban Demand
Hi XXX,
We currently have a demand on our site for Cuban cuisine.
 The search bar at the top of our site rates the demand based on how many people are searching for Cuban food downtown which is at an all-time high right now. With the demand being where it is, I'd be able to offer a much more favorable offer than you might normally see. I've included a few examples of other Cuban restaurants we work with that have seen a lot of success on our platform.
If you have a few minutes to chat today or tomorrow, please let me know. I'm not looking to sell you on anything, but want to explain how these restaurants are profiting and learn more about XXXX.
Latin Cabana
Mojito Cuban Cuisine
Guantanamera
Havana Central (3 locations)
Hope to chat soon.
XXX"

As described above, certain example embodiments of the present invention are directed to improved apparatuses, methods, and computer readable media for automating the development of merchant-specific outreach campaigns based on a three-part foundation: improved content harvesting, improved segmentation of merchants, and improved identification of triggering events that positively correlate with favourable merchant reception. As further demonstrated, utilizing embodiments of the present invention disclosed herein, these merchant-specific marketing campaigns can be highly personalized, in cadence and in content, based on sales intelligence data, optimized merchant segments, and the occurrence of relevant triggering events.

Accordingly, example embodiments of the present invention may improve merchant outreach campaigns generated by a promotion and marketing service. Through the use of automation of merchant outreach correspondence, merchant acquisition processes can be scaled quickly and consistently. In addition, by leveraging data receivable from consumers, merchants, and sales representatives, embodiments described herein improve the effectiveness of merchant acquisition efforts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for improving merchant outreach campaigns by a promotion and marketing service, the apparatus comprising:
    content harvesting circuitry configured to retrieve consumer activity data associated with consumer activities of a plurality of potential customers and sales intelligence data associated with promotion offering activities of a plurality of merchants;
    communication circuitry configured to transmit merchant-specific correspondences between the promotion and marketing service and the plurality of merchants;
    a memory configured to store the consumer activity data and the sales intelligence data;

segmentation circuitry configured to:
    determine merchant segmentation criteria for the plurality of merchants;
    determine, based on the merchant-specific correspondences transmitted between the promotion and marketing service and the plurality of merchants, historical communication preference data indicative of a historical mode of communication for the merchant-specific correspondences; and
    classify the plurality of merchants into a plurality of merchant segments for respective potential merchant outreach campaigns using the merchant segmentation criteria for the plurality of merchants and the historical communication preference data for the merchant-specific correspondences transmitted between the promotion and marketing service and the plurality of merchants, wherein the plurality of merchant segments comprise a first merchant segment whose associated sales intelligence data indicates lack of threshold promotional interest by each first merchant in the first merchant segment in a first promotional outreach when a first predicted consumer interest for the first promotional outreach fails to satisfy a predicted consumer interest threshold;
trigger detection circuitry configured to identify occurrence of a triggering event based on the consumer activity data, wherein the triggering event indicates that the first predicted consumer interest satisfies the predicted consumer interest threshold; and
campaign generation circuitry configured to, in response to identification of the triggering event by the trigger detection circuitry, generate a merchant outreach campaign associated with the first promotional outreach and transmit, to a plurality of merchant devices associated with the first merchant in the first merchant segment, a merchant-specific correspondence associated with the historical communication preference data and the merchant outreach campaign.

2. The apparatus of claim 1, wherein the content harvesting circuitry configured to retrieve the consumer activity data includes:
    hardware configured to harvest clickstream data, location data, transaction data, communication channel data, or discretionary data from at least one of a consumer device and merchant device; or
    hardware configured to, in an instance in which the consumer activity data has previously been harvested, retrieve the consumer activity data from the memory.

3. The apparatus of claim 1, wherein the segmentation circuitry is further configured to determine the merchant segmentation criteria based on at least one of the consumer activity data and sales intelligence data.

4. The apparatus of claim 1, wherein the segmentation circuitry is further configured to determine the merchant segmentation criteria based on one or more criteria selections.

5. The apparatus of claim 1, wherein the trigger detection circuitry is further configured to:
    generate a set of triggering events based on an indication of one or more selected triggering events,
    wherein the triggering event comprises a member of the set of triggering events.

6. The apparatus of claim 1, wherein the trigger detection circuitry is further configured to:
    generate a set of triggering events based on the sales intelligence data, wherein the triggering event comprises a member of the set of triggering events.

7. The apparatus of claim 6, wherein the trigger detection circuitry is further configured to:
    collect external data; and
    monitor the consumer activity data, the sales intelligence data, and the external data for occurrence of any of the identified set of triggering events,
    wherein the trigger detection circuitry is configured to identify the occurrence of the triggering event in response to the monitoring of the consumer activity data, the sales intelligence data, and the external data.

8. The apparatus of claim 7, wherein the trigger detection circuitry is further configured to alert the campaign generation circuitry upon identification of the occurrence of the triggering event.

9. The apparatus of claim 1, wherein the campaign generation circuitry is further configured to:
    identify a merchant as a target of the merchant outreach campaign;
    retrieve sales intelligence data regarding the merchant;
    generate a correspondence template based on the sales intelligence data regarding the merchant; and
    generate the merchant-specific correspondence based on the correspondence template.

10. The apparatus of claim 9, wherein the campaign generation circuitry is further configured to:
    generate a correspondence cadence specific to the merchant.

11. The apparatus of claim 10, wherein the campaign generation circuitry is further configured to:
    retrieve business analytic data specific to the merchant; and
    generate the merchant-specific correspondence based on the business analytic data specific to the merchant.

12. An apparatus for improving merchant outreach campaigns by a promotion and marketing service, the apparatus comprising:
    means for retrieving consumer activity data associated with consumer activities of a plurality of potential consumers and sales intelligence data associated with promotion offering activities of a plurality of merchants;
    means for transmitting merchant-specific correspondences between the promotion and marketing service and the plurality of merchants;
    means for storing the consumer activity data and the sales intelligence data;
    means for determining merchant segmentation criteria for the plurality of merchants;
    means for determining, based on the merchant-specific correspondences transmitted between the promotion and marketing service and the plurality of merchants, historical communication preference data indicative of a historical mode of communication for the merchant-specific correspondences;
    means for classifying the plurality of merchants into a plurality of merchant segments for respective potential merchant outreach campaigns using the merchant segmentation criteria for the plurality of merchants and the historical communication preference data for the merchant-specific correspondences transmitted between the promotion and marketing service and the plurality of merchants, wherein the plurality of merchant segments comprise a first merchant segment whose associated sales intelligence data indicates lack of threshold promotional interest by each first merchant in the first merchant segment in a first promotional outreach when a first predicted consumer interest for the first promotional outreach fails to satisfy a predicted consumer interest threshold;

means for identifying occurrence of a triggering event based on the consumer activity data, wherein the triggering event indicates that the first predicted consumer interest satisfies the predicted consumer interest threshold;

means for generating a merchant outreach campaign associated with the first promotional outreach in response to identifying occurrence of the triggering event; and means for transmitting, to a plurality of merchant devices associated with the first merchant in the first merchant segment, a merchant-specific correspondence associated with the historical communication preference data and the merchant outreach campaign.

13. The apparatus of claim 12, wherein the means for retrieving the consumer activity data includes at least one of:

means for harvesting clickstream data, location data, transaction data, communication channel data, or discretionary data from a consumer or merchant device; or means for, in an instance in which the consumer activity data has previously been harvested, retrieving the consumer activity data from the memory.

14. The apparatus of claim 12, further comprising:

means for generating a set of triggering events by receiving an indication of one or more selected triggering events, wherein the triggering event comprises a member of the set of triggering events.

15. The apparatus of claim 12, further comprising:

means for generating a set of triggering events based on the sales intelligence data, wherein the triggering event comprises a member of the set of triggering events.

16. The apparatus of claim 15, further comprising:

means for collecting external data; and means for monitoring the consumer activity data, the sales intelligence data, and the external data for occurrence of any of the identified set of triggering events, wherein the identifying the occurrence of the triggering event is in response to the monitoring of the consumer activity data, the sales intelligence data, and the external data.

17. The apparatus of claim 12, further comprising means for alerting the campaign generation circuitry upon identification of the occurrence of the triggering event.

18. The apparatus of claim 12, further comprising:

means for identifying a merchant as a target of the merchant outreach campaign;

means for retrieving sales intelligence data regarding the merchant;

means for generating a correspondence template based on the sales intelligence data regarding the merchant; and means for generating the merchant-specific correspondence based on the correspondence template.

19. A non-transitory computer-readable storage medium for improving merchant outreach campaigns by a promotion and marketing service, the non-transitory computer-readable storage medium storing program code instructions that, when executed, cause an apparatus to:

retrieve consumer activity data associated with consumer activities of a plurality of potential consumers and sales intelligence data associated with promotion offering activities of a plurality of merchants;

transmit merchant-specific correspondences between the promotion and marketing service and the plurality of merchants;

store the consumer activity data and the sales intelligence data;

determine merchant segmentation criteria for the plurality of merchants;

determine, based on the merchant-specific correspondences transmitted between the promotion and marketing service and the plurality of merchants, historical communication preference data indicative of a historical mode of communication for the merchant-specific correspondences;

classify the plurality of merchants into a plurality of segments for respective potential merchant outreach campaigns using the merchant segmentation criteria for the plurality of merchants and the historical communication preference data for the merchant-specific correspondences transmitted between the promotion and marketing service and the plurality of merchants, wherein the plurality of merchant segments comprise a first merchant segment whose associated sales intelligence data indicates lack of threshold promotional interest by each first merchant in the first merchant segment in a first promotional outreach when a first predicted consumer interest for the first promotional outreach fails to satisfy a predicted consumer interest threshold;

identify occurrence of a triggering event based on the consumer activity data, wherein the triggering event indicates that the first predicted consumer interest satisfies the predicted consumer interest threshold;

in response to identifying occurrence of the first triggering event, generate a merchant outreach campaign associated with the first promotional outreach; and transmit, to a plurality of merchant devices associated with the first merchant in the first merchant segment, a merchant-specific correspondence associated with the historical communication preference data and the merchant outreach campaign.

20. The non-transitory computer-readable storage medium of claim 19, wherein the program code instructions, when executed, further cause the apparatus to:

identify a merchant as a target of the merchant outreach campaign;

retrieve sales intelligence data regarding the merchant;

generate a correspondence template based on the sales intelligence data regarding the merchant; and generate the merchant-specific correspondence based on the correspondence template.

* * * * *

UNITED STATES PATENT AND TRADEMARK OFFICE
CERTIFICATE OF CORRECTION

PATENT NO. : 11,328,327 B1
APPLICATION NO. : 14/858468
DATED : May 10, 2022
INVENTOR(S) : Will Megson et al.

It is certified that error appears in the above-identified patent and that said Letters Patent is hereby corrected as shown below:

In the Drawings

In sheet 7 of 15, FIG. 8, reference numeral 810, Line 1, delete "Extermal" and insert -- External --, therefor.

Signed and Sealed this
Eighteenth Day of April, 2023

Katherine Kelly Vidal
*Director of the United States Patent and Trademark Office*